(12) United States Patent
Piecuch

(10) Patent No.: US 10,205,651 B2
(45) Date of Patent: Feb. 12, 2019

(54) APPARATUS AND METHOD OF SELECTING NEXT HOPS FOR A SESSION

(71) Applicant: 128 Technology, Inc., Burlington, MA (US)

(72) Inventor: Michael T. Piecuch, Hudson, NH (US)

(73) Assignee: 128 Technology, Inc., Burlington, MA (US)

(*) Notice: Subject to any disclaimer, the term of this patent is extended or adjusted under 35 U.S.C. 154(b) by 151 days.

(21) Appl. No.: 15/154,134

(22) Filed: May 13, 2016

(65) Prior Publication Data
US 2017/0331721 A1    Nov. 16, 2017

(51) Int. Cl.
| H04L 12/733 | (2013.01) |
| H04L 12/26 | (2006.01) |
| H04L 29/08 | (2006.01) |
| H04L 12/803 | (2013.01) |

(52) U.S. Cl.
CPC ........ *H04L 45/122* (2013.01); *H04L 43/0882* (2013.01); *H04L 47/125* (2013.01); *H04L 67/142* (2013.01)

(58) Field of Classification Search
CPC .. H04L 43/0882; H04L 45/122; H04L 67/142
See application file for complete search history.

(56) References Cited

U.S. PATENT DOCUMENTS

| 4,975,865 | A | 12/1990 | Carrette et al. | |
| 5,452,294 | A * | 9/1995 | Natarajan | H04L 45/00 340/2.6 |
| 6,515,963 | B1 | 2/2003 | Bechtolsheim et al. | 370/229 |
| 6,563,824 | B1 | 5/2003 | Bhatia et al. | |
| 6,584,071 | B1 | 6/2003 | Kodialam et al. | 370/238 |
| 6,721,334 | B1 | 4/2004 | Ketcham | |

(Continued)

FOREIGN PATENT DOCUMENTS

| CN | 101552703 A | 10/2009 | |
| CN | 101646220 A | 2/2010 | H04W 40/12 |

(Continued)

OTHER PUBLICATIONS

Berners-Lee et al., *Uniform Resource Identifier (URI): Generic Syntax*, Network Working Group, Request for Comments 3986, The Internet Society, 61 pages, Jan. 2005.

(Continued)

*Primary Examiner* — Rina C Pancholi
(74) *Attorney, Agent, or Firm* — Nutter McClennen & Fish LLP

(57) ABSTRACT

A method establishes a session across a plurality of nodes in a computer network using a load balancing technique. The plurality of nodes includes a current node and a plurality of next nodes, and each next hop node is coupled with the current node via a link. To determine the next hop node from the current node, the method determines the residual capacity of the links between the current node and the next nodes, and generates a random number. Next, the method selects one of the next nodes as a function of the random number and the respective residual capacities of the links between the current node and the next nodes. After selecting the one next hop node, the method directs packets for the session from the current node to the one selected next hop node.

24 Claims, 23 Drawing Sheets

(56) References Cited

U.S. PATENT DOCUMENTS

| | | |
|---|---|---|
| 6,738,387 B1 | 5/2004 | Lin et al. .................. 370/429 |
| 6,778,531 B1 | 8/2004 | Kodialam et al. ............ 370/390 |
| 6,798,743 B1 | 9/2004 | Ma et al. |
| 7,020,143 B2 | 3/2006 | Zdan |
| 7,035,214 B1 | 4/2006 | Seddigh et al. |
| 7,106,739 B2 | 9/2006 | Beier |
| 7,154,902 B1 | 12/2006 | Sikdar |
| 7,218,632 B1 | 5/2007 | Bechtolsheim et al. |
| 7,315,541 B1 | 1/2008 | Housel et al. |
| 7,373,660 B1 | 5/2008 | Guichard et al. |
| 7,466,703 B1 | 12/2008 | Arunachalam et al. |
| 7,536,720 B2 | 5/2009 | Burdett et al. |
| 7,634,805 B2 | 12/2009 | Aroya |
| 7,706,411 B2 | 4/2010 | Wakumoto et al. |
| 7,730,301 B2 | 6/2010 | Correll et al. |
| 7,773,611 B2 | 8/2010 | Booth, III et al. |
| 7,872,973 B2 | 1/2011 | Sterne et al. |
| 8,068,417 B1 | 11/2011 | Roberts .................. 370/230 |
| 8,094,560 B2 | 1/2012 | Bagepalli et al. |
| 8,139,479 B1 | 3/2012 | Raszuk |
| RE44,119 E | 4/2013 | Wang et al. |
| 8,437,248 B2 | 5/2013 | Li et al. |
| 8,527,641 B2 | 9/2013 | Degaonkar et al. |
| 8,570,893 B2 | 10/2013 | Guo et al. |
| 8,584,199 B1 | 11/2013 | Chen et al. |
| 8,634,428 B2 | 1/2014 | Le Pennec et al. |
| 8,804,489 B2 | 8/2014 | Lu et al. |
| 8,913,611 B2* | 12/2014 | Koponen ............ H04L 41/0823 370/389 |
| 8,942,085 B1 | 1/2015 | Pani et al. |
| 8,989,020 B2 | 3/2015 | So |
| 9,059,920 B2 | 6/2015 | Ravindran et al. |
| 9,160,652 B2 | 10/2015 | Taillon et al. |
| 9,240,953 B2 | 1/2016 | Carlstrom |
| 9,276,864 B1 | 3/2016 | Vincent |
| 2001/0030649 A1 | 10/2001 | Mamiya et al. ............ 345/530 |
| 2002/0044553 A1 | 4/2002 | Chakravorty ................ 370/392 |
| 2002/0075883 A1 | 6/2002 | Dell et al. .................. 370/413 |
| 2002/0176363 A1 | 11/2002 | Durinovic-Johri et al. |
| 2003/0198189 A1 | 10/2003 | Roberts et al. ............ 370/252 |
| 2003/0214938 A1 | 11/2003 | Jindal et al. .................. 370/351 |
| 2004/0088542 A1 | 5/2004 | Daude et al. |
| 2004/0228323 A1* | 11/2004 | Acharya .................. H04L 45/00 370/351 |
| 2004/0264481 A1 | 12/2004 | Darling et al. ............ 370/401 |
| 2005/0036616 A1 | 2/2005 | Huang et al. |
| 2005/0063307 A1 | 3/2005 | Samuels et al. ............ 370/235 |
| 2005/0182932 A1 | 8/2005 | Wheeler |
| 2005/0238022 A1 | 10/2005 | Panigrahy .................. 370/392 |
| 2006/0176894 A1 | 8/2006 | Oh et al. |
| 2007/0171825 A1 | 7/2007 | Roberts et al. ............ 370/235 |
| 2007/0171826 A1 | 7/2007 | Roberts et al. ............ 370/235 |
| 2008/0214175 A1 | 9/2008 | Papadoglou et al. |
| 2009/0007021 A1 | 1/2009 | Hayton |
| 2009/0059958 A1 | 3/2009 | Nakata .................. 370/474 |
| 2009/0161542 A1* | 6/2009 | Ho .................. H04L 45/02 370/231 |
| 2010/0125898 A1 | 5/2010 | Dubuc et al. |
| 2010/0191968 A1 | 7/2010 | Patil et al. |
| 2012/0144061 A1 | 6/2012 | Song |
| 2012/0176904 A1* | 7/2012 | Gray .................. H04L 45/16 370/238 |
| 2012/0236860 A1 | 9/2012 | Kompella et al. |
| 2012/0307625 A1* | 12/2012 | Ravindran ............ H04L 45/00 370/222 |
| 2013/0227166 A1 | 8/2013 | Ravindran et al. ............ 709/238 |
| 2013/0286846 A1* | 10/2013 | Atlas .................. H04L 45/34 370/236 |
| 2013/0297824 A1 | 11/2013 | Lan et al. |
| 2013/0308463 A1* | 11/2013 | Shinohara ............ H04L 45/02 370/238 |
| 2014/0040488 A1 | 2/2014 | Small et al. |
| 2015/0188814 A1 | 7/2015 | Jain et al. |
| 2015/0229618 A1 | 8/2015 | Wan et al. |
| 2015/0381324 A1 | 12/2015 | Mirsky et al. |
| 2016/0094444 A1* | 3/2016 | MeLampy ............ H04L 45/38 370/392 |

FOREIGN PATENT DOCUMENTS

| | | | |
|---|---|---|---|
| CN | 101068242 B | 4/2010 | |
| CN | 102158371 A | 8/2011 | |
| CN | 101640629 B | 8/2012 | |
| CN | 102739507 A | 10/2012 | |
| CN | 101207604 B | 3/2013 | |
| CN | 102769679 B | 6/2015 | |
| CN | 103179192 B | 11/2015 | |
| CN | 105245469 A | 1/2016 | |
| EP | 0 765 552 B1 | 5/2004 | |
| EP | 1313267 B1 | 12/2006 | ............ H04L 12/56 |
| KR | 10-2011-0062994 A | 6/2011 | |
| WO | WO 2007/084707 A2 | 7/2007 | ............... H04J 1/16 |
| WO | WO 2007/084755 A2 | 7/2007 | ............... H04J 1/16 |
| WO | WO 2008/043230 A1 | 4/2008 | |
| WO | WO 2015/131537 A1 | 9/2015 | |

OTHER PUBLICATIONS

Bjorklund, *YANG—A Data Modeling Language for the Network Configuration Protocol (NETCONF)*, Internet Engineering Task Force (IETF), Request for Comments 6020, ISSN: 2070-1721, 173 pages, Oct. 2010.
Cisco Systems, *Parallel Express Forwarding on the Cisco 10000 Series*, (White Paper) Cisco Systems, printed Jun. 17, 2015, 4 pages.
Data Plane Development Kit, *Programmer's Guide, Release 16.04.0*, 216 pages, Apr. 12, 2016.
Hansson, et al., *A Unified Approach to Constrained Mapping and Routing on Network-on-Chip Architectures*, CODES+ISSS '05 Proceedings of the 3rd IEEE/ACM/IFIP International Conference on Hardware/Software Codesign and System Synthesis, 6 pages, Sep. 19-21, 2005.
Katz et al. *Bidirectional Forwarding Detection (BFD)*, Internet Engineering Task Force (IETF), Request for Comments 5880, ISSN: 2070-1721, Juniper Networks, 49 pages, Jun. 2010.
Microsoft, *Introduction to Receive Side Scaling*, Developer Resources, https://msdn.microsoft.com/en-us/library/windows/hardware/ff556942(v=vs.85).aspx, 3 pages, Apr. 2014.
Microsoft, *RSS with a Single Hardware Receive Queue*, Developer Resources, https://msdn.microsoft.com/en-us/library/windows/hardware/ff570727(v=vs.85).aspx, 2 pages, Jan. 2015.
Microsoft, *RSS with Hardware Queuing*, Developer Resources, https://msdn.microsoft.com/en-us/library/windows/hardware/ff570728(v=vs.85).aspx, 2 pages, Jan. 2015.
Microsoft, *Non-RSS Receive Processing*, Developer Resources, https://msdn.microsoft.com/en-us/library/windows/hardware/ff568798(v=vs.85).aspx, 2 pages, Jan. 2015.
Shaw, *Multi-queue network interfaces with SMP on Linux*, Greenhost, https://greenhost.net/2013/04/10/multi-queue-network-interfaces-with-smp-on-linux/, 5 pages, Apr. 10, 2013.
Sollins et al., *Functional Requirements for Uniform Resource Names*, Network Working Group, Request for Comments 1737, 7 pages, Dec. 1994.
Srinivasan, et al., *A Technique for Low Energy Mapping and Routing in Network-on-Chip Architectures*, ISLPED '05 Proceedings of the 2005 International Symposium on Low Power Electronics and Design, 6 pages, Aug. 8-10, 2005.
Wikipedia, *Active queue management*, https://en.wikipedia.org/wiki/Active_queue_management, 2 pages, Apr. 22, 2015.
Wikipedia, *Network interface controller*, https://en.wikipedia.org/wiki/Network_interface_controller, 5 pages, May 19, 2015.
International Searching Authority, International Search Report—International Application No. PCT/US2016/013416, dated Jun. 8, 2016, together with the Written Opinion of the International Searching Authority, 12 pages.
International Searching Authority, International Search Report—International Application No. PCT/US2016/026938, dated Jul. 28, 2016, together with the Written Opinion of the International Searching Authority, 9 pages.

(56) References Cited

OTHER PUBLICATIONS

CAIDA, "Observing routing asymmetry in Internet traffic," www.caida.org/research/traffic-analysis/asymmetry, 7 pages, Jul. 17, 2013.
Chiosi et al., "Network Functions Virtualisation," SDN and OpenFlow World Congress, Darmstadt-Germany, http://portal.etsi.org/nfv/nfv_white_paper.pdf, 16 pages, Oct. 22, 2012.
Davis, "Layer 3 Switches Explained," Happy Router, 6 pages, Aug. 30, 2007.
Flisfils et al., "Segment Routing Architecture," Network Working Group, Internet—Draft, 28 pages, Oct. 2013.
Herbert, "xps: Transmit Packet Steering," Eklektix, Inc., 12 pages, Oct. 26, 2010.
IANA, "Transmission Control Protocol (TCP) Parameters," www.iana.org/assignments/tcp-parameters/tcp-parameters.xhtml, 5 pages, Sep. 22, 2014.
Klement, "1.2 Overview of a TCP communications session," RPG IV Socket Tutorial, http://www.scottklement.com/rpg/socketut/overview.html, 2 pages, 2001.
PC Magazine, "Definition of: TCP/IP abc's," PC Magazine Encyclopedia, www.pcmag.com/encyclopedia/term/52615/tcp-ip-abc-s, 5 pages, 2005.
Previdi et al., "IPv6 Segment Routing Header (SRH)," Network Working Group, Internet—Draft, 24 pages, Jul. 2014.
Roberts, "The Next Generation of IP—Flow Routing," SSGRR 2003S International Conference, L'Aquila Italy, 11 pages, Jul. 29, 2003.
Rouse, "routing table," What is routing table?—Definition from WhatIs.com, http://searchnetworking.techtarget.com/definition/routing-table, 5 pages, Apr. 7, 2007.
Shang et al., "Making Better Use of All Those TCP ACK Packets," Computer Science Department, Worcester Polytechnic Institute, 10 pages, 2005.
Wikipedia, "Equal-cost Multi-path routing," 1 page, Sep. 13, 2013.
Wikipedia, "LAN switching," 5 pages, Jun. 12, 2013.
Wikipedia, "Management information base," 6 pages, Jul. 15, 2013.
Wikipedia, "Network address translation," 11 pages, Sep. 24, 2013.
Wikipedia, "Network socket," 4 pages, Sep. 19, 2013.
Wikipedia, "Open vSwitch," 2 pages, Nov. 24, 2013.
Wikipedia, "Reverse path forwarding," 3 pages, Jul. 31, 2013.
Wikipedia, "Router (computing)," 8 pages, Sep. 23, 2013.
Wikipedia, "Software-defined networking," 6 pages, Sep. 16, 2013.
Wikipedia, "Transmission Control Protocol," 18 pages, Sep. 16, 2013.
International Searching Authority, International Search Report—International Application No. PCT/US2015/044815, dated Dec. 6, 2015 together with the Written Opinion of the International Searching Authority, 8 pages.
International Searching Authority, International Search Report—International Application No. PCT/US2015/060840, dated Mar. 8, 2016, together with the Written Opinion of the International Searching Authority, 13 pages.
International Searching Authority, International Search Report—International Application No. PCT/US2017/030184, dated Aug. 6, 2017, together with the Written Opinion of the International Searching Authority, 10 pages.

* cited by examiner

AIPR 1 708

Session X

Return Association (RA)

SSA   1.1.1.1

SSP   10

SDA   5.5.5.5

SDP   20

SPR   100

Forward Association (FA)

SSA   2.2.2.2     (implicit)

SSP   30         (session source port assigned by AIPR 1 708)

SDA   3.3.3.3     (next node address – AIPR 2 714)

SDP   40         (session destination port assigned by AIPR 1 708)

SPR   100

Flag = First Waypoint AIPR

Session Y

RA

FA

Flag

Session Z

RA

FA

Flag

*Fig. 9*

AIPR 2 714

Session X

Return Association (RA)

SSA    2.2.2.2

SSP    30

SDA    3.3.3.3    (implicit)

SDP    40

SPR    100

Forward Association (FA)

SSA    3.3.3.3    (implicit)

SSP    50    (session source port assigned by AIPR 2 714)

SDA    4.4.4.4    (next node address – AIPR 4 722))

SDP    60    (session destination port assigned by AIPR 2 714)

SPR    100

Flag = Intermediate Waypoint AIPR

Session Y

RA

FA

Flag

Session Z

RA

FA

Flag

*Fig. 10*

AIPR 4 722

Session X

Return Association (RA)

SSA    3.3.3.3

SSP    50

SDA    4.4.4.4    (implicit)

SDP    60

SPR    100

Forward Association (FA)

SSA    1.1.1.1    (original source address from metadata)

SSP    10        (original source port from metadata)

SDA    5.5.5.5    (original destination address from metadata)

SDP    20        (original destination port from metadata)

SPR    100

Flag = Final Waypoint AIPR

Session Y

RA

FA

Flag

Session Z

RA

FA

Flag

APPARATUS AND METHOD OF SELECTING NEXT HOPS FOR A SESSION

FIELD OF THE INVENTION

The invention generally relates to computer networks and, more particularly, the invention relates to establishing next hop network devices across a computer network.

BACKGROUND OF THE INVENTION

The Internet Protocol ("IP") serves as the de-facto standard for forwarding data messages ("datagrams") between network devices connected with the Internet. To that end, IP delivers datagrams across a series of network devices, such as routers and switches, in the form of one or more data packets. Current Internet devices typically forward packets one-by-one to adjacent network devices ("next hop" network devices) based essentially on the address of the destination device in the packet header. Among other benefits, this routing scheme enables network devices to forward different packets of a single datagram along different routes to reduce network congestion, or avoid malfunctioning network devices.

Some networks, such as wide area networks and local area networks, sometimes select next hop network devices based on network traffic/congestion. This selection process often is referred to in the art as "load balancing."

SUMMARY OF VARIOUS EMBODIMENTS

In accordance with one embodiment of the invention, a method establishes a session across a plurality of nodes in a computer network using a load balancing technique. The plurality of nodes includes a current node and a plurality of next nodes (i.e., potential next hop nodes), and each next node is coupled with the current node via a link. To determine which of the next nodes will be the next hop node from the current node, the method determines the residual capacity of the links between the current node and the next nodes, and generates a random number. Next, the method selects one of the next nodes as a function of the random number and the respective residual capacities of the links between the current node and the next nodes. This selected node is the next hop node. After selecting the next hop node, the method directs packets for the session from the current node to the next hop node.

Before, during and/or after generating the random number, the method may determine the sum of the residual capacity of the links between the current node and the next nodes, and generate a random number from a range of numbers. The range of numbers preferably is a function of the sum of the residual capacity of the links between the current node and the next nodes.

For example, each next node may be assigned a set of zero or more unique node values, and each such unique node value may be a function of at least one number from the range of numbers. The total number of unique node values in the sets also may be a function of the residual capacity in the links between the current node and the next nodes. In that case, the method may select the next hop node as a function of the unique node values of the next hop nodes. Viewed another way, the method may apply a weight to each next node as a function of the residual capacities, and select one of the next nodes as a function of the weights of each next node.

In addition to using a random number, the method also may determine the cost of the plurality of links between the current node and the next nodes, and then select one of the next nodes as a function of the cost. Moreover, any of a number of known techniques may be used to determine the residual capacities. For example, the method may use a maximum flow algorithm that determines the residual capacity of the links between the current node and the next nodes. Accordingly, the method may determine the residual capacity by forming a network graph where the current node and next nodes form vertices, and the links comprise edges.

After it is selected, the one selected node/next hop node may be considered to be a new current node. To continue selecting nodes, the method may repeat the acts of determining, generating, and selecting for a plurality of new current nodes in the network to a destination node. As such, the method forms a network path through the network to the destination for a given session. Thus, after the network path is formed, the method may forward packets of the given session along the selected nodes to the destination node.

Illustrative embodiments operate with stateful sessions. For example, if the current node receives a lead packet of a plurality of packets in the session, the method may modify the lead packet to identify the current node, and forward the lead packet toward a destination node, via the next hop node, to establish a stateful session. The current node subsequently may receive a backward message from the next hop node, and then store information relating to the next hop node in memory to maintain state information for the stateful session. Although not necessary, the stateful session preferably is bi-directional—it involves packets traversing from the current node to the designation node via the next hop node, and packets traversing from the destination node to the current node via the next hop node.

In accordance with another embodiment of the invention, an apparatus for establishing a session across a plurality of nodes in a computer network similar to that described above has a random number generator configured to generate a random number, and a capacity calculator operatively coupled with the random number generator. The capacity calculator is configured to determine the residual capacity of the links between the current node and the next nodes. The apparatus also has a link selector also operatively coupled with the random number generator. The link selector is configured to select one of the next nodes as a function of both the random number and the residual capacities of the links between the current node and the next nodes. As with other embodiments above, the selected node is the next hop node.

The apparatus also may have a router configured to direct packets for the session from the current node to the next hop node. The apparatus also may have a routing database that cooperates with the link selector to associate, in the routing database, both the next hop node and the current node with the session.

Illustrative embodiments of the invention are implemented as a computer program product having a computer usable medium with computer readable program code thereon. The computer readable code may be read and utilized by a computer system in accordance with conventional processes.

BRIEF DESCRIPTION OF THE DRAWINGS

Those skilled in the art should more fully appreciate advantages of various embodiments of the invention from the following "Description of Illustrative Embodiments," discussed with reference to the drawings summarized immediately below.

FIG. 9 is a schematic diagram showing session-related data associated with an AIPR 1 based on the lead packet processing of FIG. 8.

FIG. 10 is a schematic diagram showing session-related data associated with another AIPR based on the lead packet processing of FIG. 8.

FIG. 11 is a schematic diagram showing session-related data associated with yet another AIPR based on the lead packet processing of FIG. 8.

DESCRIPTION OF ILLUSTRATIVE EMBODIMENTS

Illustrative embodiments establish network sessions between nodes in a network without maintaining high-level state information about the balancing process (although other networking processes may maintain state information for other purposes). To that end, an apparatus determines residual capacities of is links between a current node and a plurality of next nodes, and assigns a set of unique values to each next node based on those residual capacities. In addition, the apparatus generates a random number that matches the unique value of one of the next nodes. For example, the random number may be equal to one of the unique values, or be a function of one of the unique values. The next node with the unique number that matches the random number then is designed as the next "hop" node, from the current node, for that session. Details of illustrative embodiments, which are particularly useful in stateful routing schemes, are discussed below.

Networks

Illustrative embodiments preferably are implemented on a conventional computer network. Among other things, a network includes at least two nodes and at least one link between the nodes. Nodes can include computing devices (sometimes referred to as hosts or devices) and routers. Computers include personal computers, smart phones, automatic teller machines (ATMs) and many other types of equipment that include processors and network interfaces. Links include wired and wireless connections between pairs of nodes. In addition, nodes and/or links may be implemented completely in software, such as in a virtual machine, a software defined network, and using network function virtualization. For example, nodes in a network may be within a single device, such as instances of a router inside a hardware router, and/or nodes in the Internet (e.g., routers) as discussed below. Many networks also include switches, which are largely transparent for purposes of this discussion. However, some switches also perform routing functions. For the present discussion, such routing is switches are considered routers. Routers are described below.

Figure 1:
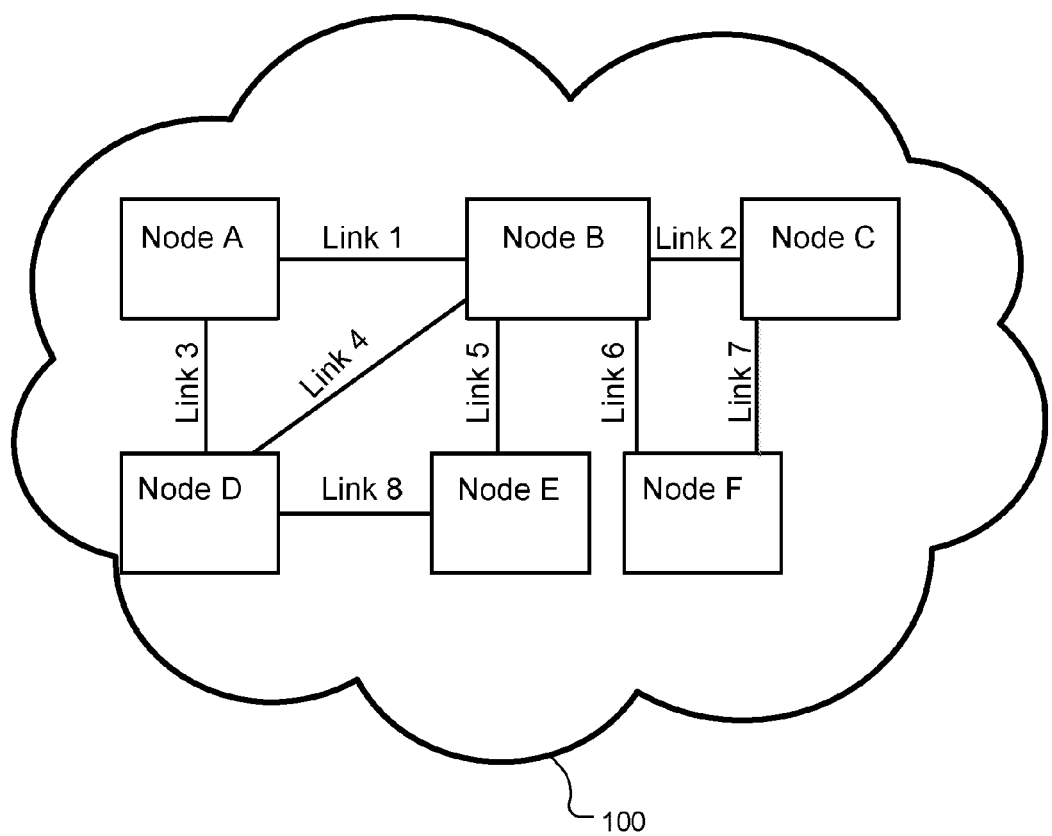
FIG. 1 schematically shows a hypothetical prior art network that may implement illustrative embodiments of the invention.

A node can be directly connected to one or more other nodes, each via a distinct link. For example, FIG. 1 schematically shows a Node A directly connected to Node B via Link 1. In a given network (e.g., within a local area network), each node has a unique network address to facilitate sending and receiving data. A network includes all the nodes addressable within the network according to the network's addressing scheme and all the links that interconnect the nodes for communication according to the network's addressing scheme. For example, in FIG. 1, Node A, Node B, Node C . . . Node F and all the links 1-8 together make up a network 100. For simplicity, a network is depicted as a cloud or as being enclosed within a cloud.

Nodes initiate communications with other nodes via the network, and nodes receive communications initiated by other nodes via the network. For example, a node may transmit/forward/send data (a message) to a directly connected (adjacent) node by sending the message via the link that interconnects the adjacent nodes. The message includes the network address of the sending node (the "source address") and the network address of the intended receiving node (the "destination address"). A sending node can send a message to a non-adjacent node via one or more other nodes. For example, Node D may send a message to Node F via Node B. Using well known networking protocols, the node(s) between the source and the destination forward the message until the message reaches its destination. Accordingly, to operate properly, network protocols enable nodes to learn or discover network addresses of non-adjacent nodes in their network.

Nodes communicate via networks according to protocols, such as the well-known Internet Protocol (IP) and Transmission Control Protocol (TCP). The protocols are typically implemented by layered software and/or hardware components, such as according to the well-known seven-layer Open System Interconnect (OSI) model. As an example, IP operates at OSI Layer 3 (Network Layer), while the TCP operates largely at OSI Layer 4 (Transport Layer). Each layer performs a logical function and abstracts the layer below it, therefore hiding details of the lower layer.

Figure 2:
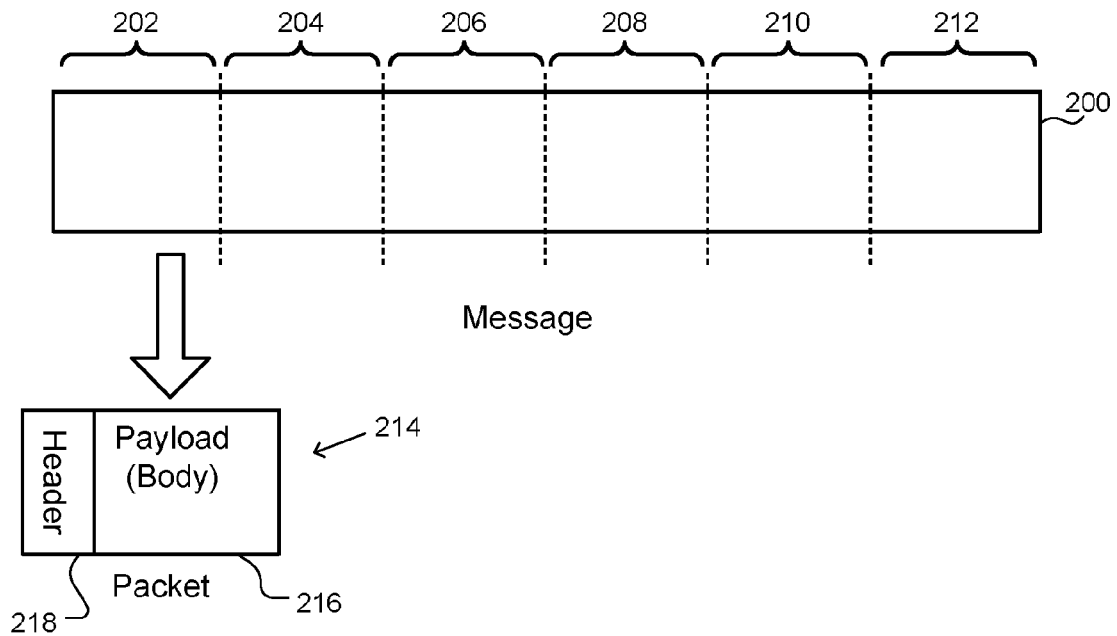
FIG. 2 schematically illustrates a prior art technique for fragmenting a message.

For example, Layer 3 may fragment a large message into smaller packets if Layer 2 (Data Link Layer) cannot handle the message as one transmission. FIG. 2 schematically illustrates a large message 200 divided into several pieces 202, 204, 206, 208, 210 and 212. Each piece 202-212 may then be sent in a separate packet, exemplified by packet 214. Each packet includes a payload (body) portion, exemplified by payload 216, and a header portion, exemplified at 218. The header portion 218 contains information, such as the packet's source address, destination address and packet sequence number, necessary or desirable for: 1) routing the packet to its destination, 2) reassembling the packets of a message, and 3) other functions provided according to the protocol. In some cases, a trailer portion is also appended to the payload, such as to carry a checksum of the payload or of the entire packet. All packets of a message need not be sent along the same path, i.e., through the same nodes, on their way to their common destination. It should be noted that although IP packets are officially called IP datagrams, they are commonly referred to simply as packets.

Some other protocols also fragment data into packets. For example, the well-known TCP protocol fragments data into segments, officially referred to as TCP protocol data units (PDUs). Nevertheless, in common usage, the term packet is used to refer to PDUs and datagrams, as well as Ethernet frames.

Most protocols encapsulate packets of higher level protocols. For example, IP encapsulates a TCP packet by adding an IP header to the TCP packet to produce an IP packet. Thus, packets sent at a lower layer can be thought of as is being made up of packets within packets. Conventionally, a component operating according to a protocol examines or modifies only information within a header and/or trailer that was created by another component, typically within another node, operating according to the same protocol. That is, conventionally, components operating according to a protocol do not examine or modify portions of packets created by other protocols.

Figure 3:
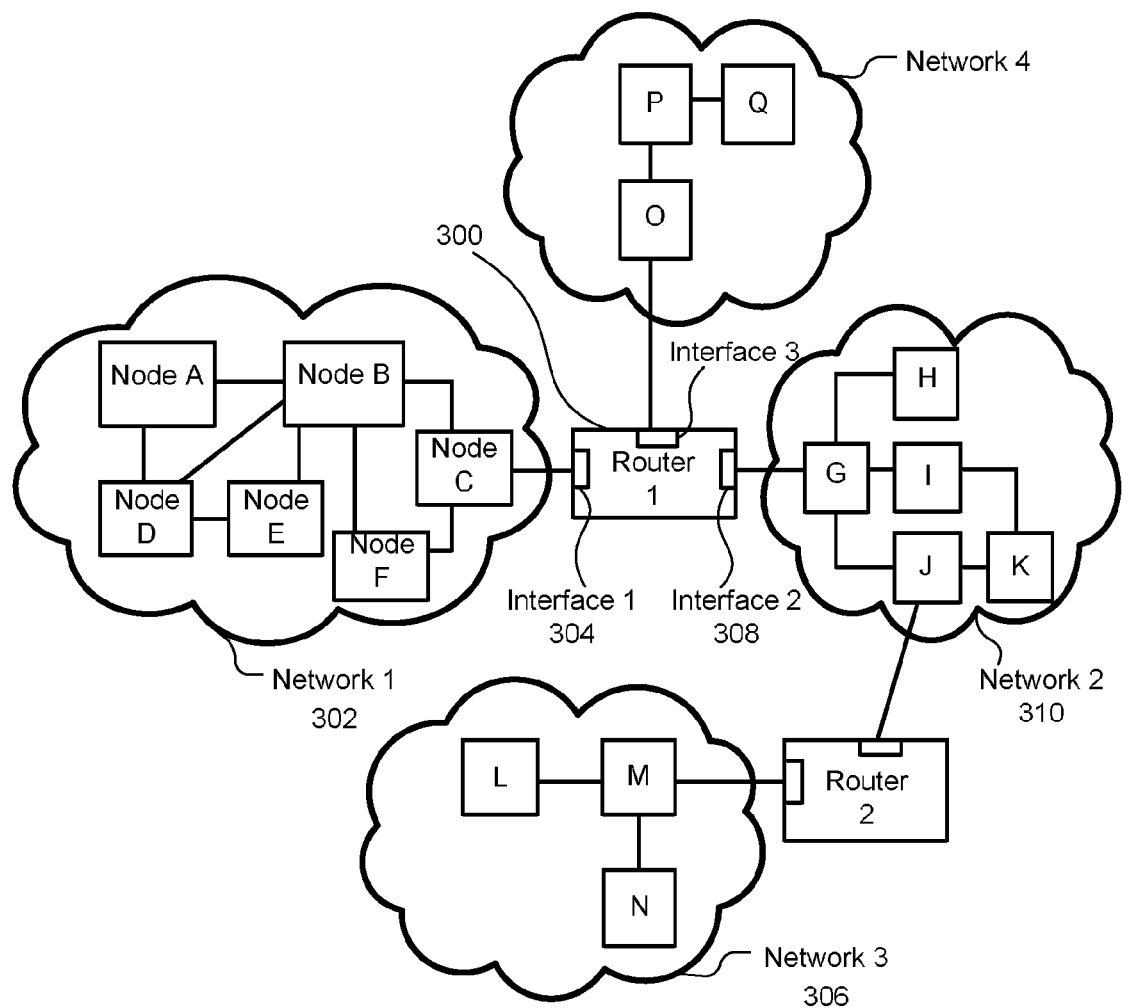
FIG. 3 schematically shows a hypothetical internet that may implement illustrative embodiments of the invention.

In another example of abstraction provided by layered protocols, some layers translate addresses. Some layers include layer-specific addressing schemes. For example, each end of a link is connected to a node via a real (e.g., electronic) or virtual interface, such as an Ethernet interface. At Layer 2 (Data Link Layer), each interface has an address, such as a media access control (MAC) address. On the other hand, at Layer 3 using IP, each interface, or at least each node, has an IP address. Layer 3 converts IP addresses to MAC addresses. A router typically acts as a node that interconnects two or more distinct networks or two or more sub-networks (subnets) of a single network, thereby creating a "network of networks" (i.e., an internet). Thus, a router has at least two interfaces; i.e., one where each interface connects the router to a different network, as exemplified in FIG. 3. When a router receives a packet via one interface from one network, it uses information stored in its routing table to direct the packet to another network via another interface. The routing table thus contains network/next hop associations. These associations tell the router that a particular destination can optimally be reached by sending the packet to a specific router that represents a next hop on the way to the final destination. For example, if Router 1 (300) receives a packet, via its Interface 1 (304), from Network 1 (302), and the packet is destined to a node in Network 3 (306), the Router 1 (300) consults its router table and then forwards the packet via its Interface 2 (308) to Network 2 (310). Network 2 (310) will then forward the packet to Network 3 (306). The next hop association can also be indicated in the routing table as an outgoing (exit) interface to the final destination.

Indeed, the next hop router or node for a given session can be determined in a variety of different manners. The below discussion about FIGS. 4-7 addresses improved techniques for determining next hop routers in accordance with illustrative embodiments of the invention.

Large organizations, such as large corporations, commercial data centers and telecommunications providers, often employ sets of routers in hierarchies to carry internal traffic. For example, one or more gateway routers may interconnect each organization's network to one or more Internet service providers (ISPs). ISPs also employ routers in hierarchies to carry traffic between their customers' gateways, to interconnect with other ISPs, and to interconnect with core routers in the Internet backbone.

A router is considered a Layer 3 device because its primary forwarding decision is based on the information in the Layer 3 IP packet—specifically the destination IP address. A conventional router does not look into the actual data contents (i.e., the encapsulated payload) that the packet carries. Instead, the router only looks at the Layer 3 addresses to make a forwarding decision, plus optionally other information in the header for hints, such as quality of service (QoS) requirements. Once a packet is forwarded, a conventional router does not retain any historical information about the packet, although the forwarding action may be collected to generate statistical data if the router is so configured.

As noted, when a router receives a packet via one interface from one network, the router uses its routing table to direct the packet to another network. Table 1 lists information typically found in a basic IP routing table (stored in memory).

TABLE 1

| | |
|---|---|
| Destination | Partial IP address (Expressed as a bit-mask) or Complete IP address of a packet's final destination |
| Next hop | IP address to which the packet should be forwarded on its way to the final destination |
| Interface | Outgoing network interface to use to forward the packet |
| Cost/Metric | Cost of this path, relative to costs of other possible paths |
| Routes | Information about subnets, including how to reach subnets that are not directly attached to the router, via one or more hops; default routes to use for certain types of traffic or when information is lacking |

Routing tables may be filled in manually, such as by a system administrator, or dynamically by the router. The router uses routing protocols to exchange information with other routers and, thereby, dynamically learn about surrounding network or internet topology. For example, routers announce their presence in the network(s), more specifically, the range of IP addresses to which the routers can forward packets. Neighboring routers update their routing tables with this information and broadcast their ability to forward packets to the network(s) of the first router. This information eventually spreads to more distant routers in a network. Dynamic routing allows a router to respond to changes in a network or internet, such as increased network congestion, new routers joining an internet and router or link failures.

A routing table therefore provides a set of rules for routing packets to their respective destinations. When a packet arrives, a router examines the packet's contents, such as its destination address, and finds the best matching rule in the routing table. The rule essentially tells the router which interface to use to forward the packet and the IP address of a node to which the packet is forwarded on its way to its final destination IP address.

With hop-by-hop routing, each routing table lists, for all reachable destinations, the address of the next node along a path to that destination, i.e., the next hop. Assuming that the routing tables are consistent, a simple algorithm of each router relaying packets to their destinations' respective next hop suffices to deliver packets anywhere in a network. Hop-by-hop is a fundamental characteristic of the IP Internetwork Layer and the OSI Network Layer. As noted above and discussed below, however, there may be a number of possible next hop node options. Accordingly, in some embodiments, the next hop node selected for a given session can be determined based on a number of factors, such as the traffic and load on a number of potential next hop nodes.

Thus, each router's routing table typically merely contains information sufficient to forward a packet to another router that is "closer" to the packet's destination, without a guarantee of the packet ever being delivered to its destination. In a sense, a packet finds its way to its destination by visiting a series of routers and, at each router, using then-current rules to decide which router to visit next, with the hope that at least most packets ultimately reach their destinations.

Note that the rules may change between two successive hops of a packet, or between two successive packets of a message, such as if a router becomes congested or a link fails. Two packets of a message may, therefore, in some cases, follow different paths and even arrive out of order. In other words, when a packet is sent by a source node, there is no predetermined path the packet will take between the source node and the packet's destination. Instead, the path typically is dynamically determined as the packet traverses the various routers. This may be referred to as "natural routing," i.e., a path is determined dynamically as the packet traverses the internet.

It should be noted that conventionally, packets sent by the destination node back to the source node may follow different paths than the packets from the source node to the destination node.

In many situations, as suggested above, a client computer node establishes a session with a server computer node, and the client and server exchange packets within the session. For example, a client computer executing a browser may establish a session with a web server. The client may send one or more packets to request a web page, and the web server may respond with one or more packets containing contents of the web page. In some types of sessions, this back-and-forth exchange of packets may continue for several cycles. In some types of sessions, packets may be sent asynchronously between the two nodes.

A session has its conventional meaning; namely, it is a plurality of packets sent by one node to another node, where all the packets are related, according to a protocol. A session may be thought of as including a lead (or initial) packet that begins the session, and one or more subsequent packets of the session. A session has a definite beginning and a definite end. For example, a TCP session is initiated by a SYN packet. In some cases, the end may be defined by a prescribed packet or series of packets. For example, a TCP session may be ended with a FIN exchange or an RST. In other cases, the end may be defined by lack of communication between the nodes for at least a predetermined amount of time (a timeout time). For example, a TCP session may be ended after a defined timeout period. Some sessions include only packets sent from one node to the other node. Other sessions include response packets, as in the web client/server interaction example. A session may include any number of cycles of back-and-forth communication, or asynchronous communication, according to the is protocol, but all packets of a session are exchanged between the same client/server pair of nodes. A session is also referred to herein as a series of packets.

A computer having a single IP address may provide several services, such as web services, e-mail services, and file transfer (FTP) services. Each service is typically assigned a port number in the range 0-65,535 that is unique on the computer. A service is, therefore, defined by a combination of the node's IP address and the service's port number. Note that this combination is unique within the network the computer is connected to, and it is often unique within an internet. Similarly, a single node may execute many clients. Therefore, a client that makes a request to a service is assigned a unique port number on the client's node, so return packets from the service can be uniquely addressed to the client that made the request.

The term socket means an IP address-port number combination. Thus, each service has a network-unique, and often internet-unique, service socket, and a client making a request of a service is assigned a network-unique, and sometimes internet-unique, client socket. In places, the terms source client and destination service are used when referring to a client that sends packets to make requests of a service and the service being requested, respectively.

Next Hop Node for Session

Figure 4:
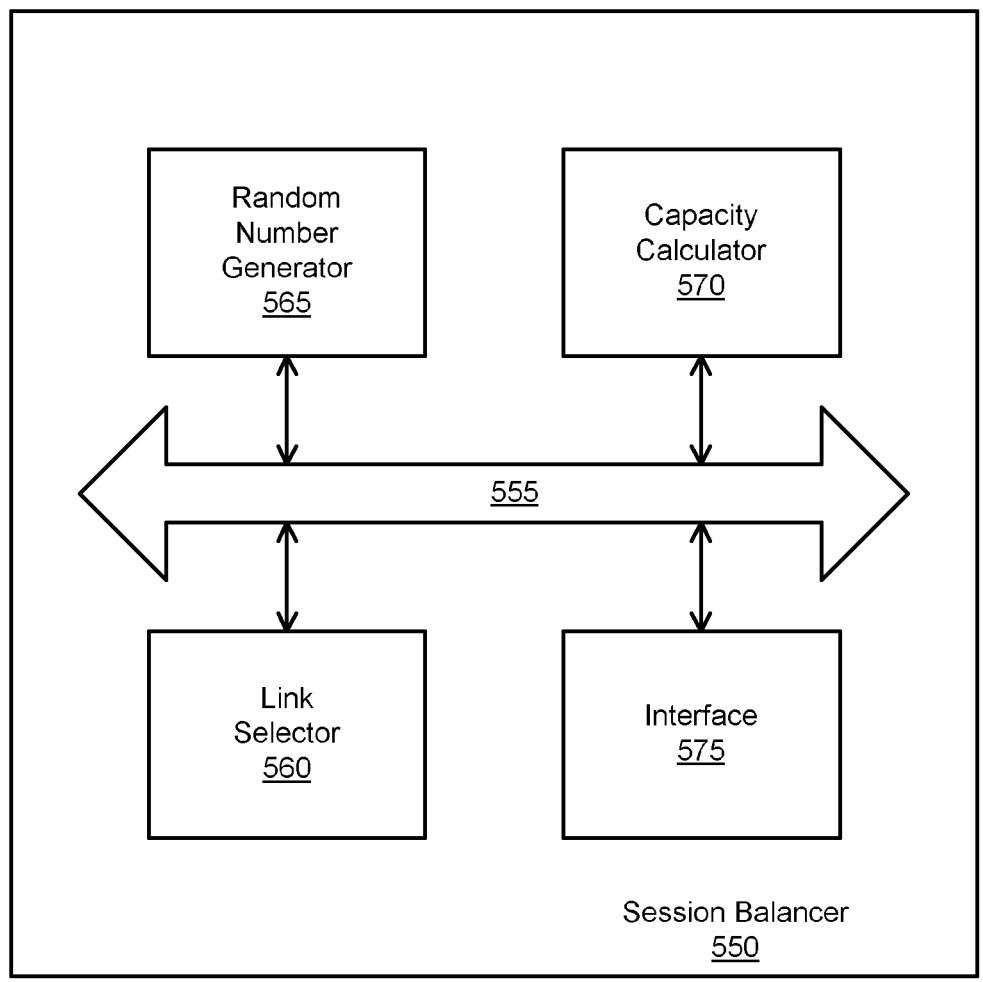
FIG. 4 schematically shows a session balancer within a network device configured in accordance with illustrative embodiments of the invention.

As noted above, an apparatus establishes sessions between nodes in a network with minimal or no high-level state information about the balancing process (although other networking processes may maintain state information). To that end, FIG. 4 schematically shows a session balancer 550 having a plurality of components that cooperate to select a next hop node in a session being established. Illustrative embodiments of the session balancer 550 select the next hop node in a manner that more efficiently balances traffic across the network.

Each of the components of the session balancer 550 is operatively connected by any conventional interconnect mechanism, identified schematically by reference number 555. FIG. 4 simply shows a bus 555 communicating each the components. Those skilled in the art should understand that this generalized representation can be modified to include other conventional direct or indirect connections. Accordingly, discussion of a bus 555 is not intended to limit various embodiments.

Indeed, it should be noted that FIG. 4 only schematically shows each of the discussed components. Those skilled in the art should understand that each of these components can be implemented in a variety of conventional manners, such as by using hardware, software, or a combination of hardware and software, across one or more other functional components. For example, the session balancer 550 has a link selector 560, discussed below, which may be implemented using a plurality of microprocessors executing firmware. As another example, the link selector 560 may be implemented using one or more application specific integrated circuits (i.e., "ASICs") and related software, or a combination of ASICs, discrete electronic components (e.g., transistors), and microprocessors. Accordingly, the representation of the link selector 560 and other components in a single box of FIG. 4 is for simplicity purposes only. In fact, in some embodiments, the session balancer 550 of FIG. 4 is distributed across a plurality of different machines—not necessarily within the same housing or chassis. Moreover, the session balancer 550 may be part of a larger device, such as a router.

It should be reiterated that the representation of FIG. 4 is a significantly simplified representation of the session balancer 550. Those skilled in the art should understand that such a device has many other physical and functional components, such as central processing units, other packet processing modules, and short-term memory. Accordingly, this discussion is in no way intended to suggest that FIG. 4 represents all of the elements of a network routing device.

The session balancer 550 has a random number generator 565 for generating a random number within a prescribed range, and a capacity calculator 570 for determining the residual capacity of the link between a current node and a next hop node. For example, with reference to the simplified network of FIG. 1, Node A may be a current node, which is coupled/connected with two potential next nodes—Node B via Link 1, and Node D via Link 3. Accordingly, to determine a next hop node (i.e., either Node B or Node D), the capacity calculator 570 may use link modelling techniques to determine the residual capacities in Link 1 and Link 3.

Using the random number and the residual capacities in the links, a link selector 560 determines an appropriate next hop node for the session. The session balancer 550 also may have an interface 575 for communicating with other devices and modules, such as a router service path.

The session balancer 550 preferably is implemented within a router, such as an AIPR discussed below. Other embodiments may implement the session balancer 550 separate from a router, or in part in a router. Those skilled in the art can select the appropriate implementation based upon a variety of factors, such as the network and anticipated traffic.

Figure 5:
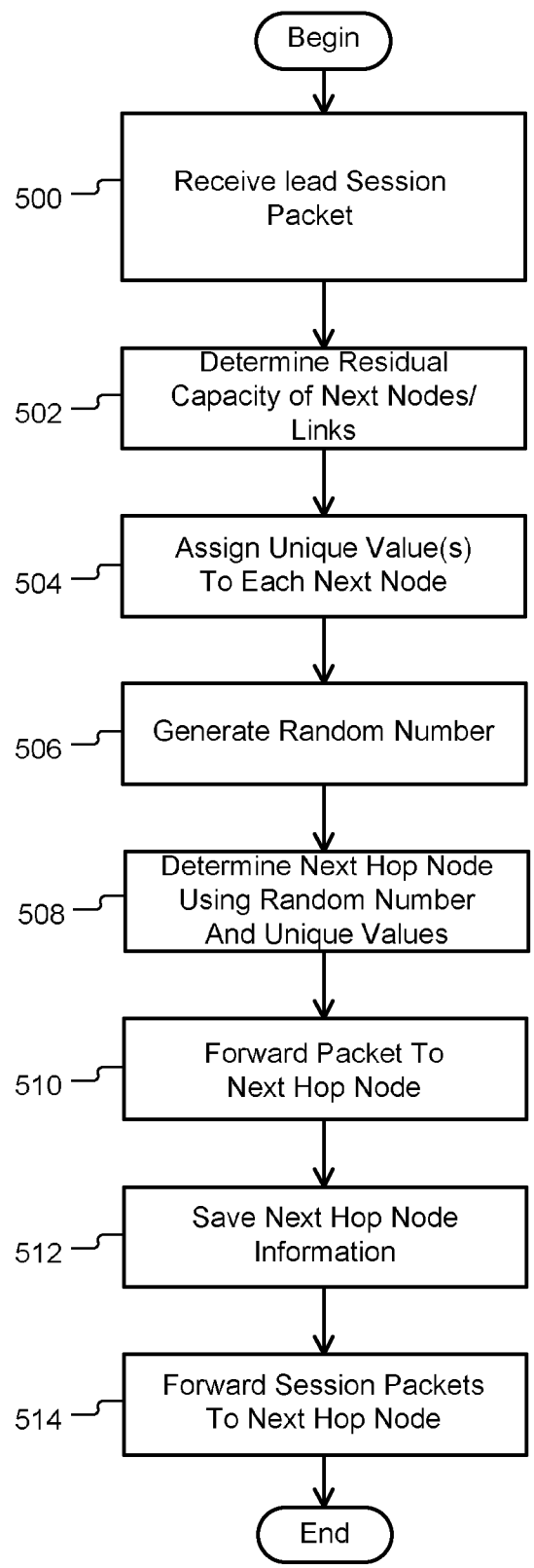
FIG. 5 shows a process of establishing a session in accordance with illustrative embodiments of the invention.

FIG. 5 shows a process of establishing a session in accordance with illustrative embodiments of the invention. It should be noted that this process is substantially simplified from a longer process that normally would be used to establish a session—it is just a portion of the overall process. Accordingly, the process of establishing a session may have many other steps, such as handshake steps and authentication steps, which those skilled in the art likely would use. In addition, some of the steps may be performed in a different order than that shown, or at the same time. Those skilled in the art therefore can modify the process as appropriate. Moreover, as noted above and below, many of the specific techniques noted are examples of a wide variety of different techniques that may be used. Those skilled in the art can select the appropriate techniques depending upon the application and other constraints. Accordingly, discussion of specific techniques is not intended to limit all embodiments.

The process of FIG. 5 begins at step 500, in which a current node receives a lead packet of the session. In other words, an interface of the current node (e.g., a router interface, such as a router interface of a below discussed AIPR) receives the first packet in a session. For example, the first/lead packet of a TCP session may be a SYN packet. This indicates that a new session is about to be established.

Figure 6:
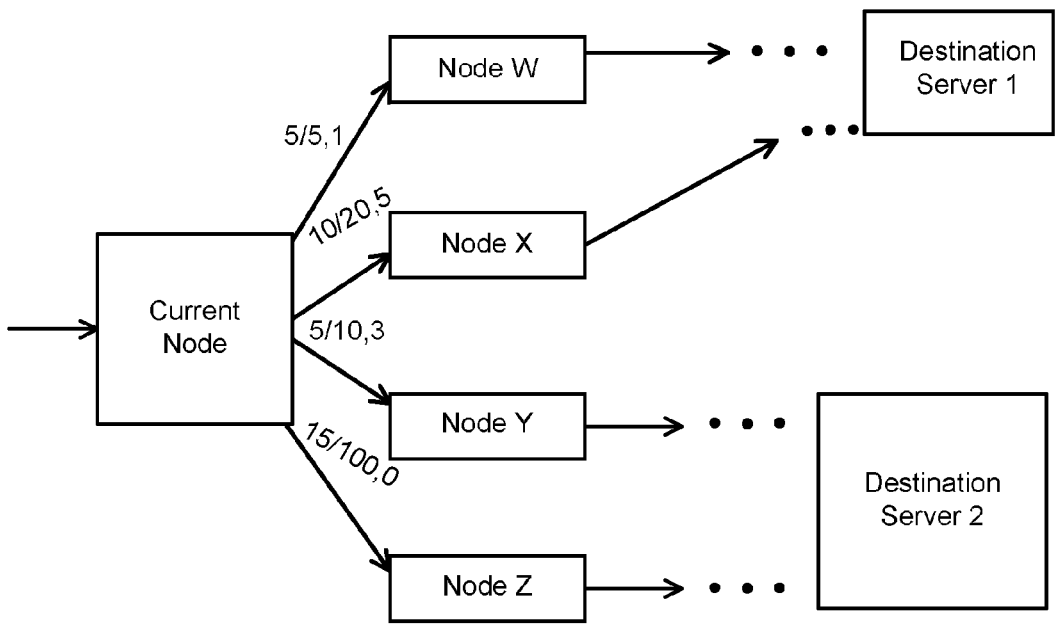
FIG. 6 schematically shows a current node and a plurality of next nodes to illustrate various steps of the process of FIG. 5.

Accordingly, the process begins executing a number of other steps to determine the next hop router. Specifically, the process continues to step 502, in which the capacity calculator 570 determines the residual capacity of all of its next nodes/links. To illustrate this, FIG. 6 schematically shows an exemplary flow graph used by the capacity calculator 570 to identify potential next hop nodes (referred to above and below as "next nodes"), and the residual capacity of those next nodes (i.e., the residual capacity of the links between the current node and each next node). In this example, the current node has four next nodes: Node W, Node X, Node Y, and Node Z. Each next node is coupled with the current node by a link. In subsequent steps, after gathering the appropriate information, illustrative embodiments select one of these four next nodes as the "next hop node" for this session. Accordingly, after selecting the next hop node, the session continues to select subsequent next hop nodes to an ultimate destination, such as Destination Server 1 or Destination Server 2.

To determine the residual capacity, the capacity calculator 570 preferably executes a conventional capacity algorithm or technique of the links between the current node and the next nodes. To that end, illustrative embodiments may execute a conventional network flow algorithm across the network from the current node to the destination. For example, as known by those skilled in the art, classes of network flow algorithms in graph theory determine the maximum and residual flows of "edges" between adjacent "vertices." In the example of FIG. 6, links function as edges, while nodes function as vertices. Accordingly, certain graph theories may consider the representation of FIG. 6 as at least a portion of a graph (e.g., it does not show the source), and which the nodes are vertices and the links are edges.

Illustrative embodiments may use the well-known "Maximum Flow/Minimum Cost" network flow/graphical technique to determine the residual flow, maximum flow, and cost through a link between nodes. Indeed, this technique is merely illustrative and not intended to limit various embodiments the invention. Accordingly, the capacity calculator 570 may use other techniques to determine the necessary information.

The capacity calculator 570 preferably executes the network flow/graphical technique for the network for each current node. Accordingly, the capacity calculator 570 associated with the current node of FIG. 6 may execute its graphing technique to determine the next hop node, while the next hop node, which then will be the current node for purposes of FIG. 5, may execute its capacity calculator 570 to determine the capacities and costs of subsequent next nodes.

The maximum capacity, residual capacity, and cost across a link all are functions of the network traffic and current condition of the network at the time the capacity calculator 570 executes its graphing technique. Generally speaking, the maximum flow through a link is the maximum flow volume that a link between two nodes may handle subject to certain constraints physical and/or express flow restrictions (e.g., a setting for a maximum flow restriction across the link).

Accordingly, when in use, a given link certainly may use some of the noted maximum capacity. For example, the capacity calculator 570 may determine that half of the maximum capacity of a given link is in use or otherwise reserved. The amount of capacity remaining for use by the current node therefore is the noted "residual capacity" of that link/node. In other words, the residual capacity through a link (i.e., of a node connected to a link) is the amount of network flow capacity remaining in a link, at the given point in time, not in use or otherwise reserved.

As noted, each link also has an associated "cost" that also can impact the selection of the next hop node. As known by those skilled in the art, the cost of a link can be quantified by any number of different criteria. For example, there can be administrative costs or performance costs. Certain performance costs may include jitter, latency, packet loss, or other performance issues. Some embodiments may have maximum or minimum cost thresholds. Some of those embodiments may avoid a link if that link has a cost that is greater than the specified maximum, or lower than the minimum specified cost threshold. For example, a packet loss of greater than 0.5 percent, a latency of 250 milliseconds, and/or a jitter of 100 milliseconds may be considered unacceptable. In that case, some embodiments may avoid a link exceeding one or more of those criteria—even if that link meets other below discussed selection criteria. As noted below, other embodiments may consider cost as part of an overall formula. For purposes of discussion, the maximum capacity, residual capacity, and cost of a link also may be referred to as the maximum capacity, residual capacity, and cost of a node.

As noted above, execution of the maximum flow/minimum cost technique generates a graph like that in FIG. 6. The graph of FIG. 6 thus has certain numbers representing the maximum capacity, residual capacity, and cost. This representation is as follows:

Residual Capacity/Maximum Capacity, Cost

Accordingly, the network of FIG. 6 shows the following values for the links coupled between the current node and the following respective nodes:
Node W: 5/5, 1
Node X: 10/20, 5
Node Y: 5/10, 3
Node Z: 15/100, 0

After determining the residual capacities of the next nodes, the process continues to step 504, in which link selector 560 assigns a set of unique values to each next node. To that end, the link selector 560 first adds up the total amount of residual capacity of all the next nodes, and assigns a set of zero or more unique values to each next node as a function of the total amount of residual capacity. Specifically, in the example shown in FIG. 6, the link selector 560 first determines that the total residual capacity is equal to 35 (i.e., 5+10+5+15).

This total residual capacity forms a range of 35 unique values to be applied to the next nodes. In a simple case, these unique values can simply be consecutive whole numbers equal to the range, such as 0-34, 1-35, or 101-1036. As another simple example, these unique values can be whole or fractional multiples of the integers in the range, such as 2, 4, 6, 8 . . . 70. In a less simple case, the link selector 560 produces the unique values by using numbers in the range as variables to a mathematical function. For example, each number in the residual capacity range can be the variable x in the following function:

$$\text{Unique Value}=3x*4+0.45$$

Using the simple case (i.e., simply assigning integer number(s) in the residual capacity range to the next nodes), the link selector 560 assigns a set of unique values to each next node based on its residual capacity. Specifically, the set includes a total number of unique values equal to its residual capacity. For example, if a next node has a residual capacity of three, then it will receive a set of three unique values. Similarly, if the next node has no residual capacity, then it will receive a set of zero unique values. The simple case thus may assign the following unique values to each of the nodes of FIG. 6:
Node W: 1, 2, 3, 4, 5
Node X: 6, 7, 8, 9, 10, 11, 12, 13, 14, 15,
Node Y: 16, 17, 18, 19, 20
Node Z: 21, 22, 23, 24, 25, 26, 27, 28, 29, 30, 31, 32, 33, 34, 35

As described below, these unique values will be used to select the next hop node. The process thus continues to step 506, in which the random number generator 565 produces a random number within the range specified by the residual capacity. Specifically, the random number generator 565 is configured to produce one of the unique numbers associated with one of the next nodes. Accordingly, and the example of FIG. 6, the random number generator 565 may produce a number between one and 35. Of course, if unique numbers of the next nodes were formed by a more complex function, such as the function above, then the random number generator 565 may produce one of the unique values that the noted function produces for the next nodes. In some embodiments, however, the random number generator 565 also may produce numbers that are not one of the noted unique numbers. In that case, the random number itself may be processed, such as by a function, to produce one of the unique numbers.

The link selector 560 then determines the next hop node using the random number/unique value produced by the random number generator 565 (step 508). In other words, the link selector 560 matches the random number to one of the unique values of the next nodes. To that end, in the example of FIG. 6, the link selector 560 determines which next node has a unique value equal to the random number. In FIG. 6, if the random number is 18, then the link selector 560 determines that Node Y is the next hop router because the number 18 is one of its unique assigned values. In other embodiments, however, as noted above, the random number may be related to one of the unique values by a function or other means. Accordingly, requiring the random number to be exactly the same as the unique value, as in the example of FIG. 6, is one of a number of different approaches. In various embodiments, an important factor is the randomness of the generated number, and its application to the unique values.

After selecting the next hop node, the router may forward the lead packet to the next hop node selected by the session balancer 550 (step 510), and save information relating to the next hop node in a local database (e.g., a forwarding information base, step 512). As discussed below with respect to stateful routing embodiments, this information about the next hop node will be useful for packets for the session traversing the network. Accordingly, the router forwards subsequently received packets of this session to the next hop node (step 514).

As noted above, some embodiments also may consider cost when selecting the next hop node. Specifically, the link selector 560 may have a formula or prescribed criterion that takes into account both the random number/unique value of the next nodes, as well as the cost. For example, the link selector 560 may not choose a next node having a matching unique value to the random number if the cost is too high (e.g., see the example above with regard to jitter and other costs). As a second example, the link selector 560 may not assign unique values to the next node if it has a high cost. In that case, the total residual capacity may not take that omitted next node into account when assigning the unique values.

As also noted above, this process repeats at the next hop node. Specifically, at that point, the next hop node may be considered the current node, and the process determines the next hop node from that upstream node. This process preferably repeats, next hop node by next hop node, to the destination, thus forming a path through the network for the given session. Of course, other embodiments may perform this process on a subset of upstream next nodes. For example, some next nodes may not have appropriate functionality to perform this process. In illustrative embodiments and discussed in greater detail below, the process forms a bidirectional path for the session.

Indeed, this technique of selecting a next hop router is nondeterministic, and potentially could produce undesirable next hop node distributions. During experimentation and simulations, however, the technique provided a weighted distribution/selection of next hop routers closely tracking each router's percent of the noted total residual next node capacity. Over longer periods of time for selecting next hop routers, this beneficial result became more evident. Accordingly, using the example of FIG. 6, the routers would have the following probabilities of receiving a next hop router assignment:

Node W: 5/35 (i.e., 14.3%)
Node X: 10/35 (i.e., 28.6%)
Node Y: 5/35 (i.e., 14.3%)
Node Z: 15/35 (i.e., 42.9%)

The experimentation and simulations also showed that the distribution continues to follow/track the weightings, even if the weights change frequently and drastically.

This technique therefore takes advantage of probability theory to avoid the need to save state information relating to load balancing/next hop node selection. For example, if the system used a round robin approach of selecting the next hop node, it would be required to save information about a number of variables, such as the next hop nodes selected in prior assignments.

Illustrative embodiments are particularly useful with a stateful routing scheme. Accordingly, as noted above, various embodiments may configure its local network device, implementing various embodiments, to operate in a stateful mode, summarized below and explained in greater detail in the incorporated patent applications.

Stateful Routing

In certain exemplary embodiments, at least some of the routers in the communication system are specially configured to perform "stateful" routing on packets associated with a given session between a source node and destination node, as discussed herein. For convenience, such routers are referred to above and below as Augmented IP Routers (AIPRs) or waypoint routers. AIPRs and stateful routing also are discussed in related incorporated patent applications, which are incorporated by reference above. For convenience, packets being routed from the source node toward the destination node may be referred to herein as "forward" packets or the "forward" direction or path, and packets being routed from the destination node toward the source node may be referred to herein as "reverse" packets or the "reverse" direction or path.

Generally speaking, stateful routing is a way to ensure that subsequent packets of a session follow the same path as the lead packet of the session through a particular set of AIPRs in the forward and/or reverse direction. The lead packet of the session may pass through one or more AIPRs, either due to traditional routing, or by having each successive AIPR through which the lead packet passes expressly select a next hop AIPR if possible. For example, illustrative embodiments permit an AIPR or similarly enabled router to use the noted lead session balancer 550 to select an appropriate next hop router/AIPR.

The AIPRs through which the lead packet passes insert special metadata into the lead packet and optionally also into return packets as needed to allow each AIPR on the path to determine whether there is a prior node or AIPR on the path and whether there is a next hop node or AIPR on the path. To force session packets to traverse the same set of AIPRs, each successive AIPR typically changes the destination address field in each session packet to be the address of the next hop AIPR, and changes the source address field in each session packet to be its own network address. The last AIPR prior to the destination node then will change the source and destination address fields back to the original source and destination addresses used by the source node. In this way, session packets can be forwarded, hop by hop, from the source node through the set of AIPRs to the destination node, and vice versa.

It should be noted that discussion of an AIPR is but one embodiment. Other embodiments may perform the process of FIG. 5 using routers without all the described functionality of an AIPR.

Figure 7:
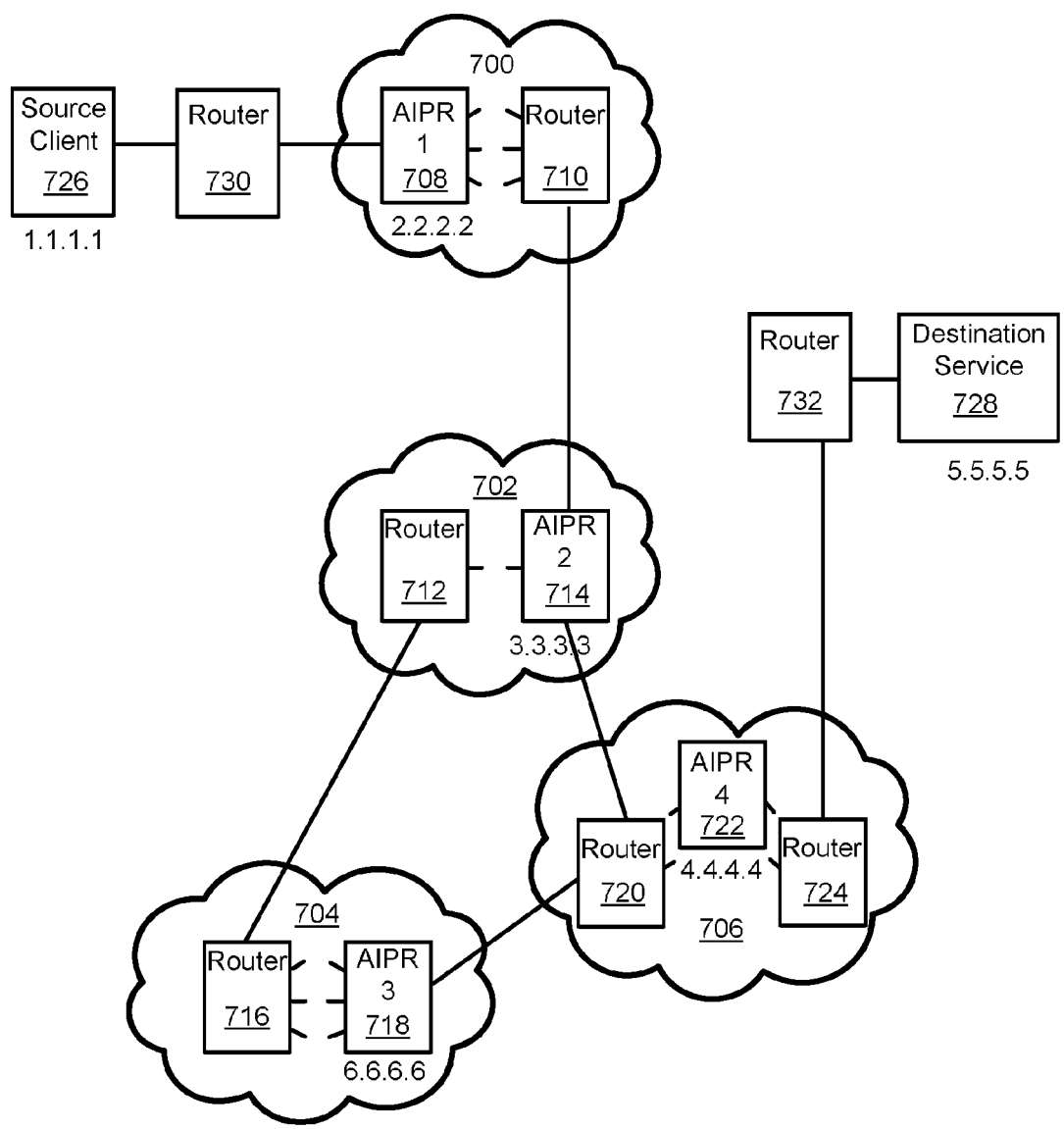
FIG. 7 schematically shows a hypothetical internet that includes conventional routers and augmented IP routers (AIPRs), in accordance with one exemplary embodiment.

Certain aspects of one exemplary stateful routing embodiment are now described with reference to FIGS. 7-15. FIG. 7 schematically shows a hypothetical internet that includes conventional routers and AIPRs, according to one exemplary embodiment of the present invention. Among other things, FIG. 7 illustrates a hypothetical set of interconnected networks 700, 702, 704 and 706, i.e., an internet. Each network 700-706 includes a number of routers and AIPRs, not all of which are necessarily shown. Network 700 includes AIPR 1 708 and router 710. Network 700 may be, for example, a network of a telecommunications carrier. Network 702 includes a router 712 and AIPR 2 714. Network 702 may be, for example, a network of a first ISP. Network 704 includes a router 716 and AIPR 3 718. Network 704 may be, for example, the Internet backbone or a portion thereof. Network 706 includes a router 720, AIPR 4 722 and another router 724. Network 706 may be, for example, a network of a second ISP. For the sake of this discussion, the source client node 726 is associated with fictitious network address 1.1.1.1; AIPR 1 708 is associated with fictitious network address 2.2.2.2; AIPR 2 714 is associated with fictitious network address 3.3.3.3; APIR 3 718 is associated with fictitious network address 6.6.6.6; AIPR 4 722 is associated with fictitious network address 4.4.4.4; and destination service node 728 is associated with fictitious network address 5.5.5.5. It should be noted that the present invention is not limited to the network shown in FIG. 7 or to any particular network.

Figure 8:
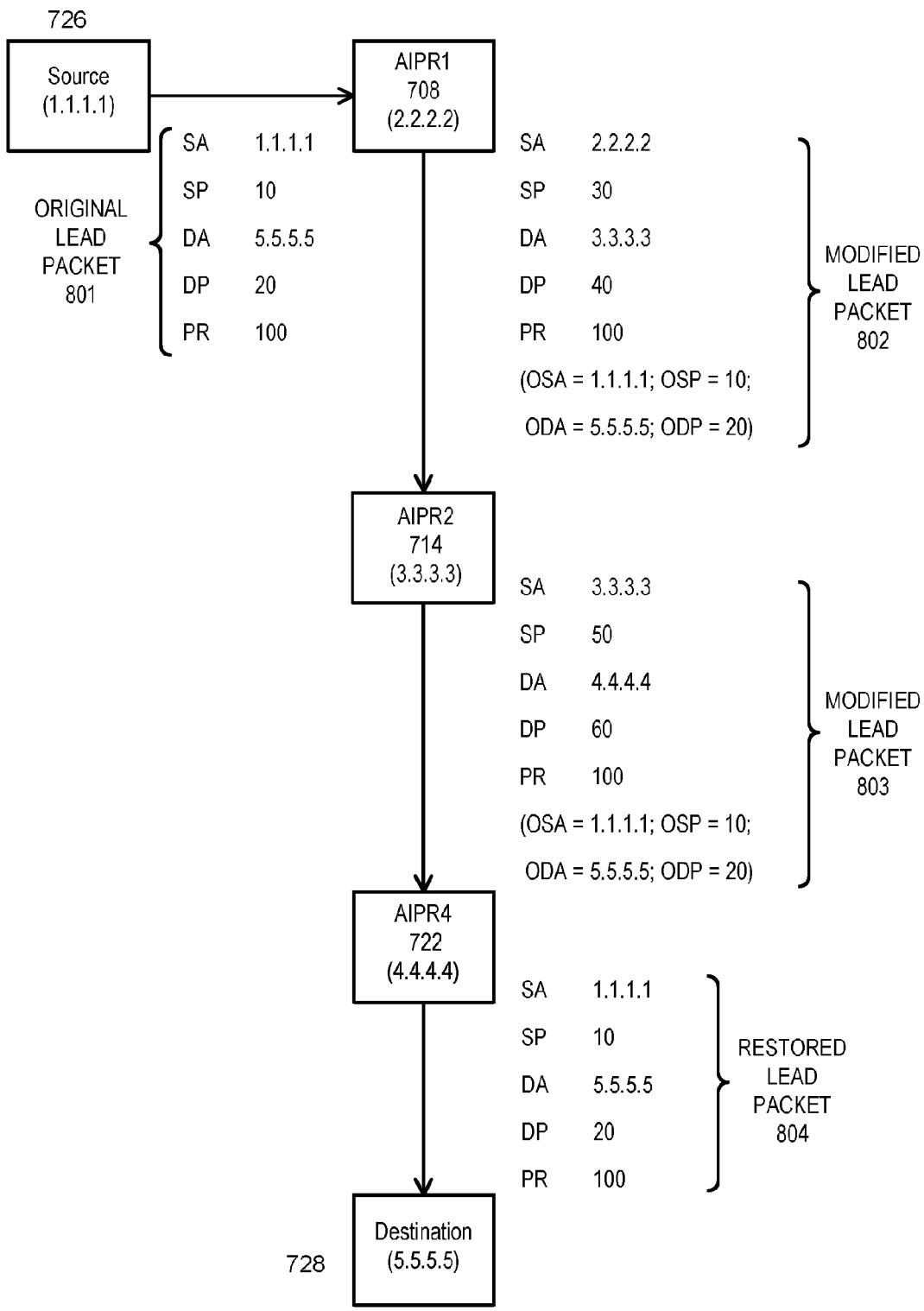
FIG. 8 schematically shows an example of lead packet processing from a source node to a destination node for stateful routing, in accordance with one exemplary embodiment.
Figure 12:
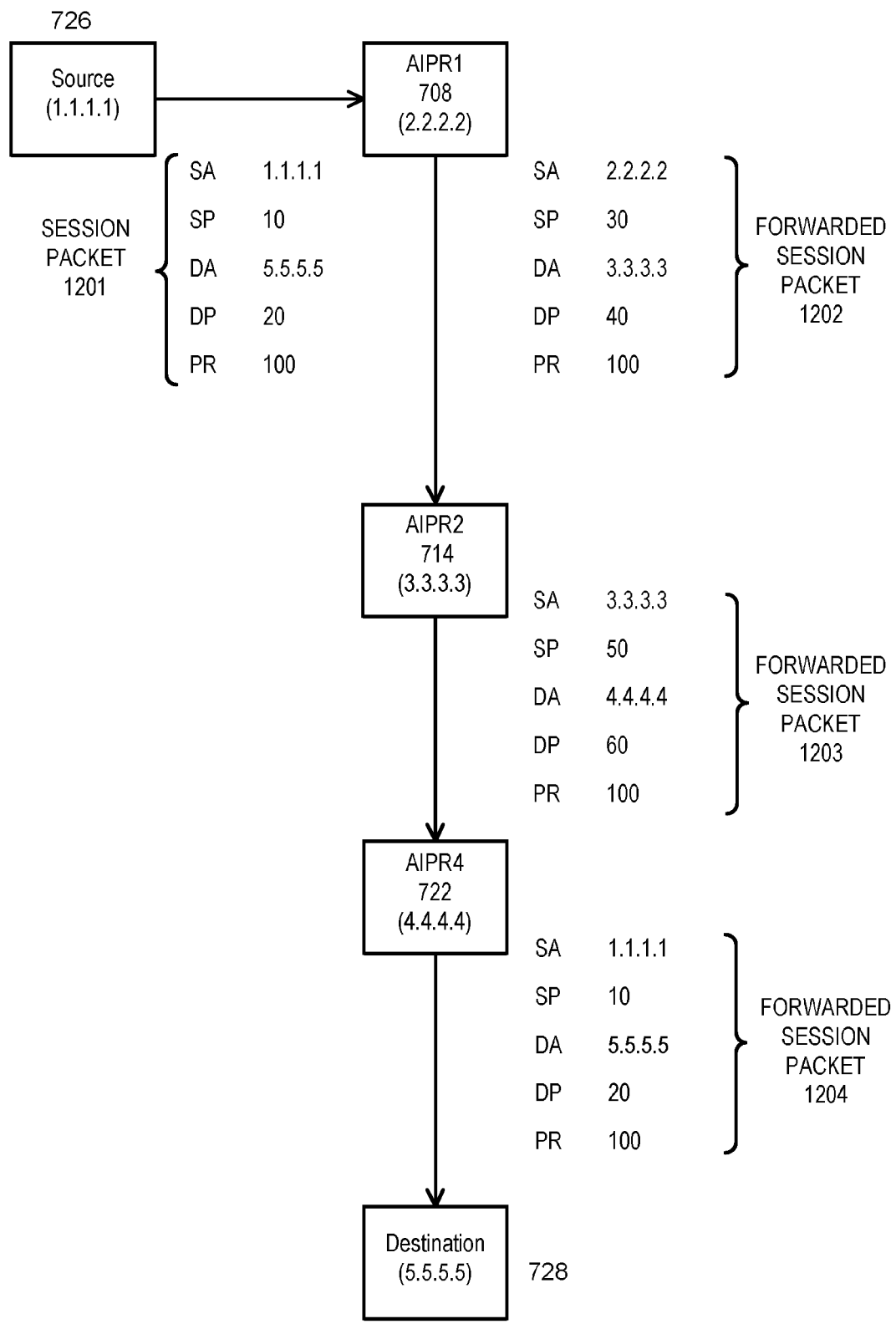
FIG. 12 is a schematic diagram providing an example of session packet processing for an example packet sent from the source device to the destination device through the AIPR devices for the session established in FIG. 8, in accordance with one exemplary embodiment.
Figure 13:
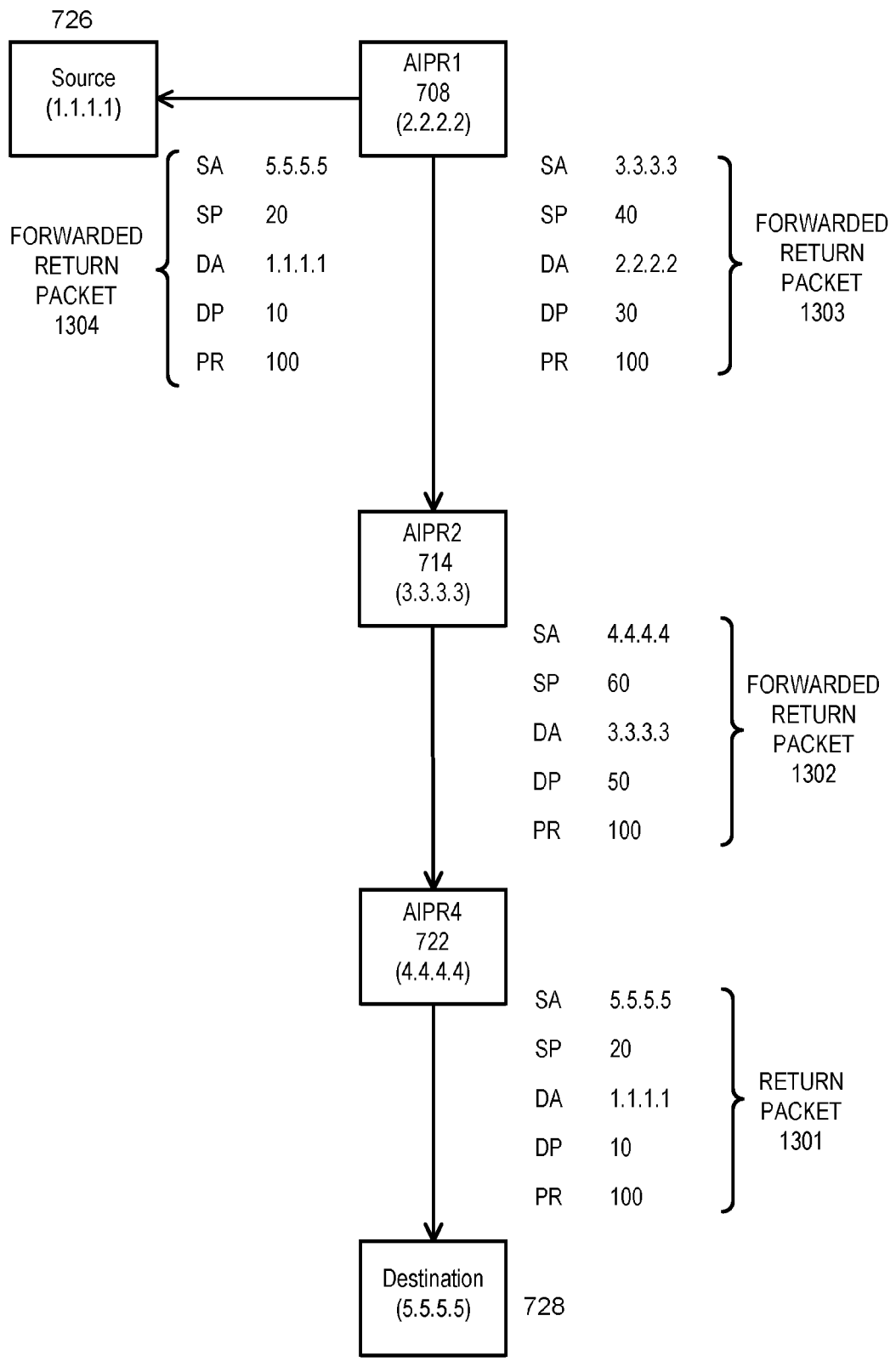
FIG. 13 is a schematic diagram providing an example of session packet processing for a return packet sent by the destination device to the source device through the AIPR devices for the session established in FIG. 8, in accordance with one exemplary embodiment.

FIG. 8 schematically shows an example of lead packet processing from a source node to a destination node for stateful routing, in accordance with illustrative embodiments of the invention. FIG. 9 is a schematic diagram showing session-related data associated with AIPR 1 708 based on the lead packet processing of FIG. 8. FIG. 10 is a schematic diagram showing session-related data associated with AIPR 2 714 based on the lead packet processing of FIG. 8. FIG. 11 is a schematic diagram showing session-related data associated with AIPR 4 722 based on the lead packet processing of FIG. 8. FIG. 12 is a schematic diagram providing an example of session packet processing for an example packet sent from the source device to the destination device through the AIPR devices for the session established in FIG. 8. FIG. 13 is a schematic diagram providing an example of session packet processing for a return packet sent by the destination device to the source device through the AIPR devices for the session established in FIG. 8.

In this example, each AIPR is presumed to have a priori knowledge of the other AIPRs in the network in relation to the network/next hop associations contained in its routing information base, such that, for example, a particular AIPR knows not only the outgoing port for a particular destination network address, but also the next waypoint AIPR (if any) to use for that destination network address.

As noted above, in stateful routing, all forward packets associated with a particular session are made to follow the same path through a given set of AIPRs on their way from the source client node 726 to the destination service node 728. In a similar manner, all return packets associated with the session typically (but not necessarily, are made to traverse the same set of AIPRs in reverse order on their way from the destination service node 728 to the source client node 726.

Assume the source client node 726 initiates a session with the destination service node 728. For example, the source client node 726 may request a web page, and the destination service node 728 may include a web server. The source client node 726 may, for example, be part of a first local area network (LAN) (not shown) within a first corporation, and the LAN may be connected to the telecommunications carrier network 700 via a gateway router 730 operated by the corporation. Similarly, the destination service node 728 may be operated by a second corporation, and it may be part of a second LAN (not shown) coupled to the network 706 of the second ISP via a gateway router 732 operated by the second corporation.

To establish a communication session between the source client node 726 and the destination service node 728, the source client node 726 typically transmits a lead packet for the session, which generally initiates a communication exchange between the source client node 726 and the destination service node 728. This allows subsequent session-related packets to be exchanged by the two nodes. The type of lead packet will depend on the protocol(s) being used by the source and destination nodes. For the example used herein, TCP/IP-based communications are assumed, in which case the lead packet may include a TCP SYN message carried in an IP datagram. This lead packet typically will include a source address equal to the IP address of the source client node 726 (i.e., 1.1.1.1), a destination address equal to the IP address of the destination service node 728 (i.e., 5.5.5.5), and various types of Transport Layer information including a source port number, a destination port number, and a protocol identifier. For convenience, the combination of source address, source port number, destination address, destination port number, and protocol identifier in a packet is referred to hereinafter collectively as a "5-tuple" and is used in various exemplary embodiments as a session identifier for "stateful" routing, as discussed below.

FIG. 8 shows an exemplary lead packet 801 transmitted by the source client node 726. In this example, the lead packet 801 includes a source address (SA) of 1.1.1.1; a source port number (SP) of 10; a destination address (DA) of 5.5.5.5; a destination port number (DP) of 20; and a protocol identifier (PR) of 100.

The lead packet 801 may be routed naturally and therefore, depending on various factors, the lead packet may or may not reach an AIPR on its way from the source node to the destination node. Thus, waypoints are not necessarily predetermined before the lead packet is transmitted by the source node. However, in some exemplary embodiments, a particular AIPR (e.g., AIPR 1 708 in FIG. 7) may be configured as the default router/gateway for the source node, in which case the lead packet is virtually assured to reach an AIPR.

Assume the lead packet 801 reaches AIPR 1 708 before it reaches network 702, 704 or 706. AIPR 1 708 automatically identifies the lead packet as being an initial packet of a new session (in this example, referred to as "Session X"). AIPR 1 708 may use various techniques to identify the beginning of a session, as discussed in more detail below. For example AIPR 1 708 may identify the beginning of the session based on the 5-tuple of information in the lead packet. AIPR 1 708 also determines that the lead packet 801 is not a modified lead packet containing session metadata. Therefore, AIPR 1 708 determines that it is the first waypoint AIPR for Session X and stores an indicator so that it will process subsequent packets associated with the session as the first waypoint AIPR. This is represented in FIG. 9 as "Flag=First Waypoint AIPR."

AIPR 1 708 stores 5-tuple information from the received lead packet 801 as the Return Association (RA) for Session X. This is represented in FIG. 9 as "Return Association" information. For convenience, the source address, source port number, destination address, destination port number, and protocol identifier information associated with a particular session is referred to in FIGS. 9-11 as session source address (SSA), session source port number (SSP), session destination address (SDA), session destination port number (SDP), and session protocol identifier (SPR), respectively.

To forward a modified lead packet (i.e., Modified Lead Packet 802) over an outgoing interface, AIPR 1 708 accesses its routing information base to look up routing information based on the original destination address of 5.5.5.5 (e.g., outgoing interface and next node information). In this example, AIPR 1 708 identifies AIPR 2 714 as the next waypoint AIPR based on the original destination address of 5.5.5.5. In certain exemplary embodiments, AIPR 1 708 then assigns a source port number and a destination port number for outgoing packets associated with the session to permit more than 65,535 sessions to be supported concurrently (in this example, source port number 30 and destination port number 40) and stores the resulting 5-tuple as the Forward Association (FA) for outgoing packets associated with the session. This is shown in FIG. 9 as "Forward Association" information. Implicitly, the network address of AIPR 1 708 (i.e., 2.2.2.2) will be the source address for session-related packets forwarded over an outgoing interface.

Illustrative embodiments may identify the next AIPR in any of a variety of manners. For example, the AIPR may have a local session balancer 550 that identifies a plurality of next nodes (i.e., potential next hop node), which may include all AIPRs, both AIPRs and routers, or in some cases just routers without AIPR functionality. The session balancer 550 then may select the next hop node, whether it is an AIPR or a router without AIPR functionality (preferably leading to an AIPR though), in accordance with the process of FIG. 5.

To force the lead packet to reach next waypoint AIPR 2 714 (as opposed to being randomly routed by the routers in the network), AIPR 1 708 modifies the destination address in the lead packet to the IP address of AIPR 2 714 (i.e., 3.3.3.3). In this example, AIPR 1 708 also modifies the source address in the lead packet to its own IP address (i.e., 2.2.2.2) so that AIPR 2 714 can route return packets back to AIPR 1 708. Also in this example, AIPR 1 708 modifies the source port and destination port fields to the assigned values. Importantly, AIPR 1 708 also modifies the lead packet to include a section of metadata including the original source address, destination address, source port, destination port, and protocol identifier from the original lead packet 801. As discussed below, this metadata is propagated to each successive AIPR on the path to allow each AIPR to maintain session information and also to allow the final AIPR on the path to restore the lead packet to its original form. AIPR 1 708 establishes and maintains various session parameters so that it can identify subsequent session packets and forward such session packets to AIPR 2 714 for stateful routing. AIPR 1 708 then transmits the modified lead packet 802 into the network toward AIPR 2 714 via the selected outgoing interface. In certain exemplary embodiments, AIPR 1 708 may establish a flow that associates the session with the incoming interface over which the lead packet 801 was received and the outgoing interface over which the modified lead packet 802 is forwarded.

FIG. 8 shows an exemplary modified lead packet 802 transmitted by AIPR 1 708. The modified lead packet 802 includes the network address of AIPR 1 708 (i.e., 2.2.2.2) as the source address (SA), the assigned session source port number (SSP) of 30 as the source port number (SP), the network address of AIPR 2 714 (i.e., 3.3.3.3) as the destination address (DA), the assigned session destination port number (SDP) of 40 as the destination port number (DP), and the received protocol identifier of 100 as the protocol identifier (PR). AIPR 1 708 also includes the original source address (OSA) of 1.1.1.1, the original source port number (OSP) of 10, the original destination address (ODA) of 5.5.5.5, and the original destination port number (ODP) of 20 from the original lead packet 801 as metadata in the modified lead packet 802. This information is shown in parentheses to represent that it is metadata that has been added to the lead packet.

In this example, AIPR 1 708 forwards the modified lead packet 802 to AIPR 2 714 via router 710. The modified lead packet 802 packet may traverse other routers between AIPR 1 708 and AIPR 2 714. Because the destination address in the modified lead packet 802 is set to the IP address of AIPR 2 714 (i.e., 3.3.3.3), the modified lead packet should eventually reach AIPR 2 714.

AIPR 2 714 automatically identifies the modified lead packet 802 as being an initial packet of the session, but also identifies that AIPR 2 714 is not the first waypoint for the session because the modified lead packet already contains metadata inserted by AIPR 1 708. AIPR 2 714 therefore becomes the second waypoint along the path the lead packet eventually follows.

AIPR 2 714 stores 5-tuple information from the received modified lead packet 802 as the Return Association (RA) for Session X. This is represented in FIG. 10 as "Return Association" information.

To forward a modified lead packet (i.e., Modified Lead Packet 803) over an outgoing interface, AIPR 2 714 accesses its routing information base to look up routing information based on the original destination address of 5.5.5.5 (e.g., outgoing interface and next node information). In this example, AIPR 2 714 identifies two possible next hop AIPRs for the lead packet to reach destination service node 728, namely AIPR 3 718 and AIPR 4 722. Assume AIPR 2 714 selects AIPR 4 722 as the next hop AIPR for the path (e.g., using the process of FIG. 5). AIPR 2 714 therefore determines that it is an intermediate waypoint AIPR for the session, i.e., it is neither the first waypoint AIPR nor the last waypoint AIPR. AIPR 2 714 stores an indicator so that it will process subsequent packets associated with the session as an intermediate waypoint AIPR. This is represented in FIG. 10 as "Flag=Intermediate Waypoint AIPR." In this example, AIPR 2 714 then assigns a source port number and a destination port number for outgoing packets associated with the session (in this example, source port number 50 and destination port number 60) and stores the resulting 5-tuple as the Forward Association (FA) for outgoing packets associated with the session. This is shown in FIG. 10 as "Forward Association" information. Implicitly, the network address of AIPR 2 714 (i.e., 3.3.3.3) will be the source address for session-related packets forwarded over an outgoing interface.

To force the modified lead packet 803 to reach AIPR 4 722 (as opposed to being randomly routed by the routers in the network), AIPR 2 714 modifies the destination address in the lead packet to the IP address of AIPR 4 722 (i.e., 4.4.4.4). In this example, AIPR 2 714 also modifies the source address in the lead packet to its own IP address (i.e., 3.3.3.3) so that AIPR 4 722 can route return packets back to AIPR 2 714. Also in this example, AIPR 2 714 modifies the source port and destination port fields to the assigned values. Importantly, AIPR 2 714 leaves the section of metadata including the original source address, destination address, source port, destination port, and protocol identifier. AIPR 2 714 establishes and maintains various session parameters so that it can identify subsequent session packets and forward such session packets to AIPR 4 722 for stateful routing. AIPR 2 714 then transmits the modified lead packet 803 into the network toward AIPR 4 722 via the selected outgoing interface. In certain exemplary embodiments, AIPR 2 714 may establish a flow that associates the session with the incoming interface over which the modified lead packet 802 was received and the outgoing interface over which the modified lead packet 803 is forwarded.

FIG. 8 shows an exemplary modified lead packet 803 transmitted by AIPR 2 714. The modified lead packet 803 includes the network address of AIPR 2 714 (i.e., 3.3.3.3) as the source address (SA), the assigned session source port number (SSP) of 50 as the source port number (SP), the network address of AIPR 4 722 (i.e., 4.4.4.4) as the destination address (DA), the assigned session destination port number (SDP) of 60 as the destination port number (DP), and the received protocol identifier of 100 as the protocol identifier (PR). AIPR 2 714 also includes the original source address (OSA) of 1.1.1.1, the original source port number (OSP) of 10, the original destination address (ODA) of 5.5.5.5, and the original destination port number (ODP) of 20 from the modified lead packet 802 as metadata in the modified lead packet 803. This information is shown in parentheses to represent that it is metadata that has been added to the lead packet.

In this example, AIPR 2 714 forwards the modified lead packet 803 to AIPR 4 722 via router 720. The modified lead packet 803 may traverse other routers between AIPR 2 714 and AIPR 4 722. Because the destination address in the modified lead packet 803 is set to the IP address of AIPR 4 722 (i.e., 4.4.4.4), the modified lead packet should eventually reach AIPR 4 722.

AIPR 4 722 automatically identifies the modified lead packet as being an initial packet of the session, but also identifies that AIPR 4 722 is not the first waypoint for the session because the modified lead packet already contains metadata inserted by AIPR 2 714. AIPR 4 722 therefore becomes the third waypoint along the path the lead packet eventually follows.

AIPR 4 722 stores 5-tuple information from the received modified lead packet 803 as the Return Association (RA) for Session X. This is represented in FIG. 11 as "Return Association" information.

To forward a modified lead packet (i.e., Modified Lead Packet 804) over an outgoing interface, AIPR 4 722 accesses its routing information base to look up routing information based on the original destination address of 5.5.5.5 (e.g., outgoing interface and next node information). AIPR 4 722 determines that there is no next hop AIPR for the lead packet to reach destination service node 728. AIPR 4 722 therefore determines that it is the last waypoint AIPR on the path. AIPR 4 722 stores an indicator so that it will process subsequent packets associated with the session as a final waypoint AIPR. This is represented in FIG. 11 as "Flag=Final Waypoint AIPR." AIPR 4 722 then stores the original 5-tuple information as the Forward Association (FA) for outgoing packets associated with the session. This is shown in FIG. 11 as "Forward Association" information.

As the last waypoint AIPR, AIPR 4 722 performs special processing on the lead packet. Specifically, AIPR 4 722 removes the metadata section from the lead packet and restores the source address, destination address, source port, destination port, and protocol identifier fields in the lead packet back to the original values transmitted by source client node 726, which it obtains from the metadata in modified lead packet 803. AIPR 4 722 establishes and maintains various session parameters so that it can identify subsequent session packets and forward such session packets to destination service node 728 for stateful routing. AIPR 4 722 then transmits the restored lead packet 804 into the network toward destination service node 728 via the selected outgoing interface. In certain exemplary embodiments, AIPR 4 722 may establish a flow that associates the session with the incoming interface over which the lead packet 803 was received and the outgoing interface over which the restored lead packet 804 is forwarded.

FIG. 8 shows an exemplary restored lead packet 804 transmitted by AIPR 4 722. The restored lead packet 804 includes the original source address of 1.1.1.1 as the source address (SA), the original source port number (SSP) of 10 as the source port number (SP), the original destination device address of 5.5.5.5 as the destination address (DA), the original destination port number of 20 as the destination port number (DP), and the received/original protocol identifier of 100 as the protocol identifier (PR).

In this example, AIPR 4 722 forwards the restored lead packet 804 to destination service node 728 via routers 724 and 732. The restored lead packet 804 may traverse other routers between AIPR 4 722 and destination service node 728. Because the destination address in the restored lead packet 804 is set to the IP address of destination service node 728 (i.e., 5.5.5.5), the restored lead packet should eventually reach destination service node 728.

Thus, as a lead packet of the session traverses the internet when the session is established, each AIPR (waypoint) that the packet traverses records information that eventually enables the waypoint to be able to identify its immediately previous waypoint and its immediately next waypoint, with respect to the session.

While all AIPRs in this example establish the session using the process of FIG. 5, some embodiments may have AIPRs that do not use that process. For example, some AIPRs may use the process of FIG. 5, while others may use other techniques to determine the next hop node (e.g., natural routing or a round robin technique).

It should be noted that each node can store information for multiple sessions. For example, FIGS. 9-11 schematically show information stored for additional Sessions Y and Z. As for Session X, the information stored for Sessions Y and Z includes Return Association (RA) information, Forward Association (FA) information, and a Flag. It should be noted that the AIPRs may have different roles in different sessions, e.g., whereas AIPR 1 708 is the first waypoint AIPR and AIPR 4 722 is the final waypoint AIPR in the example of FIG. 8, AIPR 1 708 could be the final waypoint AIPR for Session Y and could be an intermediate waypoint AIPR for Session Z.

After the lead packet has been processed and the session-related information has been established by the waypoint AIPRs hop-by-hop from the source client node 726 to the destination service node 728, additional session packets may be exchanged between the source client node 726 and the destination service node 728 to establish an end-to-end communication session between the source client node 726 and the destination service node 728.

FIG. 12 is a schematic diagram providing an example of session packet processing for an example session packet sent from the source client node 726 to the destination service node 728 through the AIPR devices for the session established in FIG. 8. Here, the source client node 726 sends a session packet 1201 having a source address (SA) of 1.1.1.1; a source port number of 10 (i.e., the original SP); a destination address of 5.5.5.5; a destination port number of 20 (i.e., the original DP); and a protocol identifier of 100. Because AIPR 1 708 is the default router/gateway for source 1.1.1.1, the session packet 1201 is routed by the network to AIPR 1 708.

Based on the 5-tuple information contained in the received session packet 1201 and the Return Association stored in memory by AIPR 1 708, AIPR 1 708 is able to determine that the received session packet 1201 is associated with Session X. AIPR 1 708 forwards the packet according to the Forward Association information associated with Session X as shown in FIG. 9. Specifically, the forwarded session packet 1202 transmitted by AIPR 1 708 has a source address (SA) of 2.2.2.2; a source port number of 30 (i.e., the SSP assigned by AIPR 1 708); a destination address of 3.3.3.3; a destination port number of 40 (i.e., the SDP assigned by AIPR 1 708); and a protocol identifier of 100.

Since the forwarded session packet 1202 has a destination address of 3.3.3.3 (i.e., the network address of AIPR 2 714), the session packet 1202 is routed to AIPR 2 714. Based on the 5-tuple information contained in the received session packet 1202 and the Return Association stored in memory by AIPR 2 714, AIPR 2 714 is able to determine that the received session packet 1202 is associated with Session X. AIPR 2 714 forwards the packet according to the Forward Association information associated with Session X as shown in FIG. 10. Specifically, the forwarded session packet 1203 transmitted by AIPR 2 714 has a source address (SA) of 3.3.3.3; a source port number of 50 (i.e., the SSP assigned by AIPR 2 714); a destination address of 4.4.4.4; a destination port number of 60 (i.e., the SDP assigned by AIPR 2 714); and a protocol identifier of 100.

Since the forwarded session packet 1203 has a destination address of 4.4.4.4 (i.e., the network address of AIPR 4 722), the session packet 1203 is routed to AIPR 4 722. Based on the 5-tuple information contained in the received session packet 1203 and the Return Association stored in memory by AIPR 4 722, AIPR 4 722 is able to determine that the received session packet 1203 is associated with Session X. AIPR 4 722 forwards the packet according to the Forward Association information associated with Session X as shown in FIG. 11. Specifically, the forwarded session packet 1204 transmitted by AIPR 4 722 has a source address (SA) of 1.1.1.1 (i.e., the original source address); a source port number of 10 (i.e., the original SP); a destination address of 5.5.5.5 (i.e., the original destination address); a destination port number of 20 (i.e., the original DP); and a protocol identifier of 100.

Since the forwarded session packet 1204 has a destination address of 5.5.5.5 (i.e., the network address of destination service node 728), the forwarded session packet 1204 is routed to the destination service node 728, which processes the packet.

FIG. 13 is a schematic diagram providing an example of session packet processing for a return packet sent by the destination device to the source device through the AIPR devices for the session established in FIG. 8.

Here, the destination service node 728 sends a return packet 1301 having a source address (SA) of 5.5.5.5; a source port number of 20 (i.e., the original DP); a destination address of 1.1.1.1 (i.e., the original source address); a destination port number of 10 (i.e., the original SP); and a protocol identifier of 100. In this example, AIPR 4 722 is the default router/gateway for destination 5.5.5.5, so the return packet 1301 is routed by the network to AIPR 4 722.

Based on the 5-tuple information contained in the received return packet 1301 and the Forward Association stored in memory by AIPR 4 722, AIPR 4 722 is able to determine that the received return packet 1301 is associated with Session X. AIPR 4 722 forwards the packet according to the Return Association information associated with Session X as shown in FIG. 11. Specifically, the forwarded return packet 1302 transmitted by AIPR 4 722 has a source address (SA) of 4.4.4.4; a source port number of 60 (i.e., the SDP assigned by AIPR 2 714); a destination address of 3.3.3.3; a destination port number of 50 (i.e., the SSP assigned by AIPR 2 714); and a protocol identifier of 100.

Since the forwarded return packet 1302 has a destination address of 3.3.3.3 (i.e., the network address of AIPR 2 714), the return packet 1302 is routed to AIPR 2 714. Based on the 5-tuple information contained in the received return packet 1302 and the Forward Association stored in memory by AIPR 2 714, AIPR 2 714 is able to determine that the received return packet 1302 is associated with Session X. AIPR 2 714 forwards the packet according to the Return Association information associated with Session X as shown in FIG. 10. Specifically, the forwarded return packet 1303 transmitted by AIPR 2 714 has a source address (SA) of 3.3.3.3; a source port number of 40 (i.e., the SDP assigned by AIPR 1 708); a destination address of 2.2.2.2; a destination port number of 30 (i.e., the SSP assigned by AIPR 1 708); and a protocol identifier of 100.

Since the forwarded return packet 1303 has a destination address of 2.2.2.2 (i.e., the network address of AIPR 1 708), the return packet 1303 is routed to AIPR 1 708. Based on the 5-tuple information contained in the received return packet 1303 and the Forward Association stored in memory by AIPR 1 708, AIPR 1 708 is able to determine that the received return packet 1303 is associated with Session X. AIPR 1 708 forwards the packet according to the Return Association information associated with Session X as shown in FIG. 9. Specifically, the forwarded return packet 1304 transmitted by AIPR 1 708 has a source address (SA) of 5.5.5.5; a source port number of 20 (i.e., the original DP); a destination address of 1.1.1.1; a destination port number of 10 (i.e., the original SP); and a protocol identifier of 100.

Since the forwarded return packet 1304 has a destination address of 1.1.1.1 (i.e., the network address of source client node 726), the forwarded return packet 1304 is routed to the source client node 726, which processes the packet.

It should be noted that an AIPR can assign source and destination port numbers in any of a variety of ways (e.g., sequentially, non-sequentially, and randomly).

Figure 14:
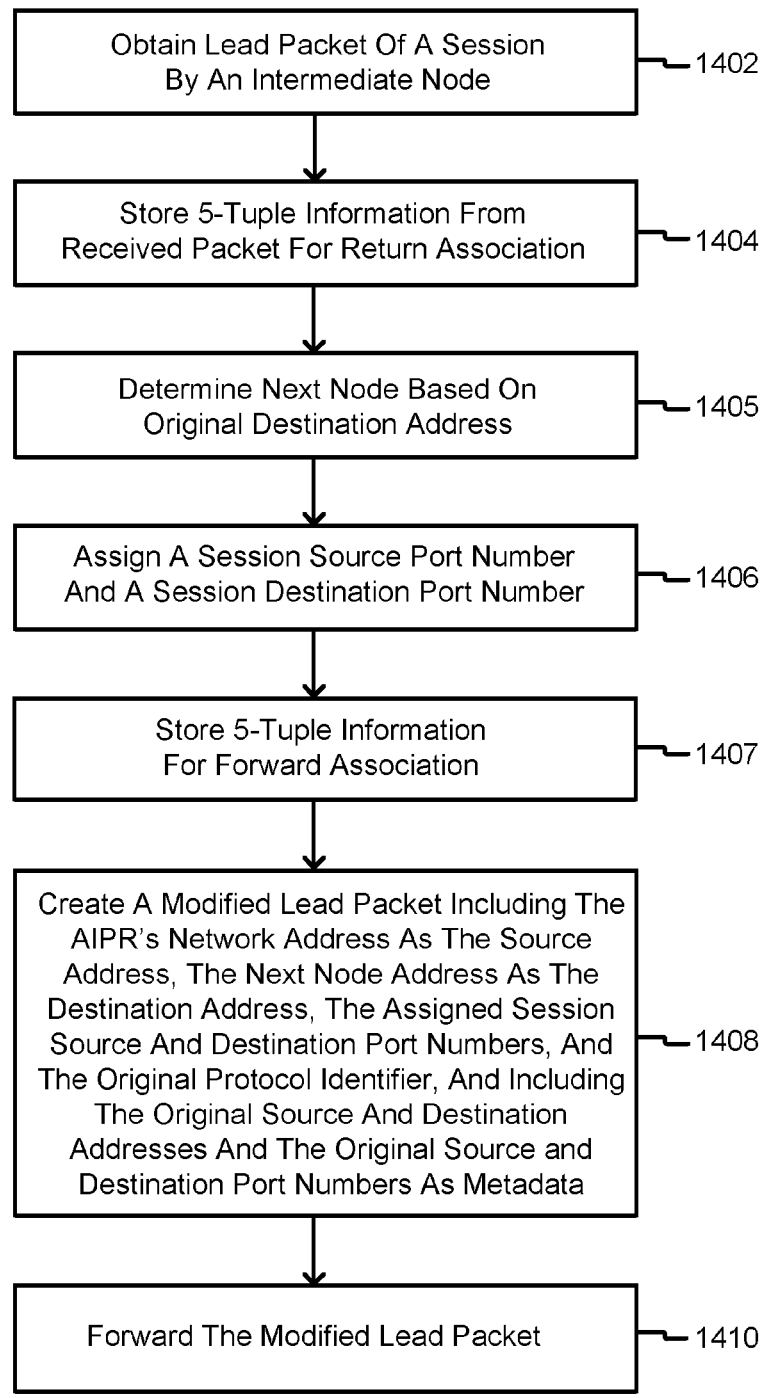
FIG. 14 is a flowchart schematically illustrating some lead packet processing operations performed by an AIPR, in accordance with one exemplary embodiment.

FIG. 14 is a flowchart schematically illustrating some lead packet processing operations performed by an intermediate AIPR, in accordance with one exemplary embodiment.

In block 1402, an intermediate AIPR obtains the lead packet of a session. In block 1404, the AIPR stores 5-tuple information from the received packet as Return Association information for the session.

In block 1405, the AIPR determines the next node/waypoint AIPR based on the original destination address. This typically involves accessing the AIPR's routing information base from which the AIPR can determine the outgoing port and next waypoint AIPR (if any) for the original destination address. As noted above, this preferably involves use of the session balancer 550 and the process of FIG. 5.

In block 1406, the AIPR assigns a session source port number and a session destination port number.

In block 1407, the AIPR stores 5-tuple information for a Forward Association. The Forward Association includes the AIPR's network address as the source address, the next node address as the destination address, the assigned session source and destination port numbers, and the original protocol identifier.

In block 1408, the AIPR creates a modified lead packet including the AIPR network address as the source address, the next node address as the destination address, the assigned session source and destination port numbers, and the original protocol identifier, and also including the original source and destination addresses and the original source and destination port numbers as metadata. In block 1410, the AIPR forwards the modified lead packet.

It should be noted that the flowchart of FIG. 14 applies to intermediate AIPRs other than the final waypoint AIPR, which performs slightly different processing as discussed above (e.g., the final waypoint AIPR uses the original source address, original source port number, original destination address, and original destination port number contained in the metadata of the received packet for its Forward Association information).

Figure 15:
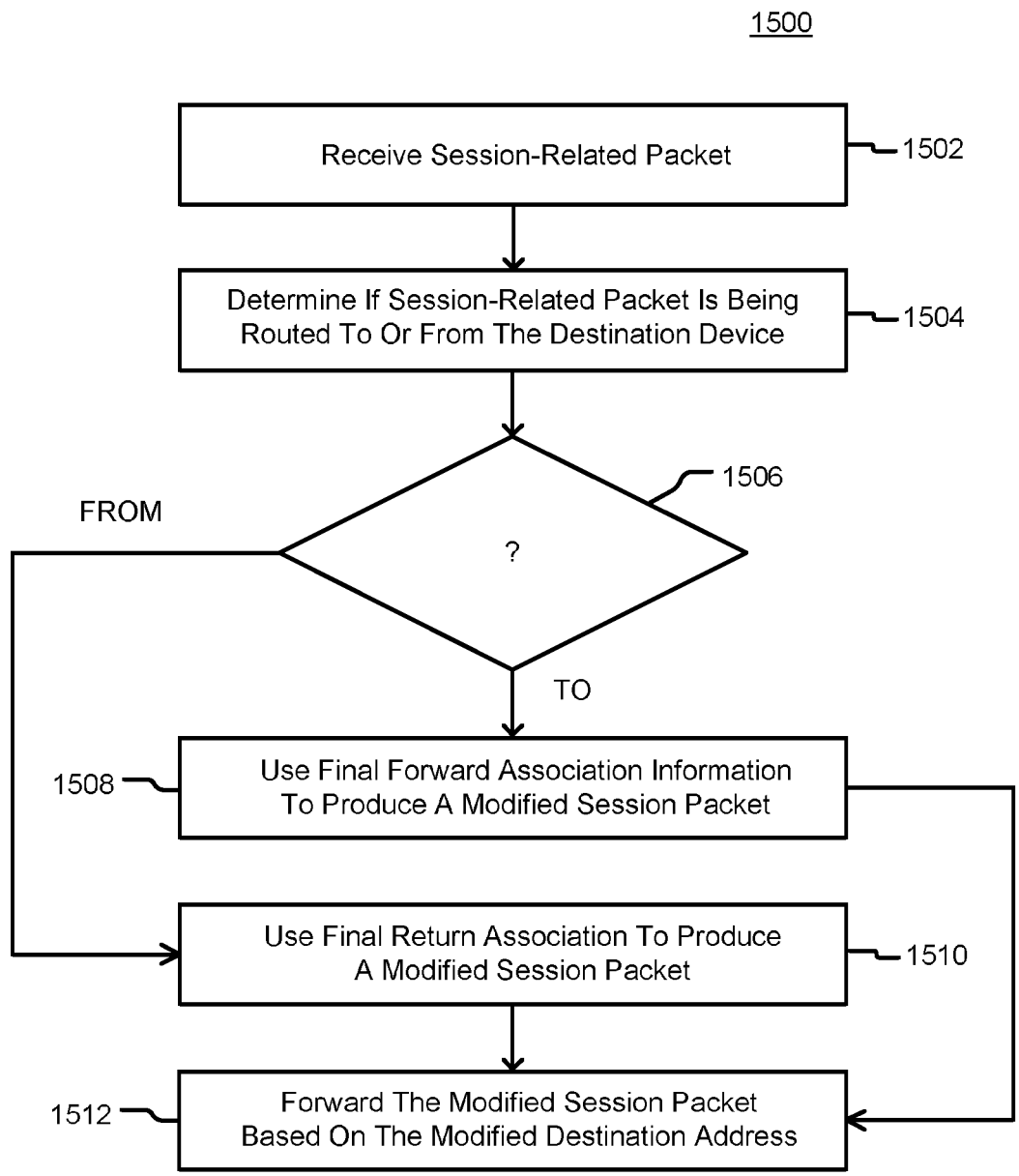
FIG. 15 is a flowchart schematically illustrating some session packet processing operations performed by an AIPR, in accordance with one exemplary embodiment.

FIG. 15 is a flowchart schematically illustrating some packet processing operations performed by an AIPR, in accordance with one exemplary embodiment. In block 1502, the AIPR receives a session-related packet. In block 1504, the AIPR determines if the session-related packet is being routed to or from the destination device. If the session-related packet is being routed to the destination device in block 1506, then the AIPR uses the Final Forward Association information to produce a modified session packet, in block 1508. If, however, the session-related packet is being routed from the destination device in block 1506, then the AIPR uses the Final Return Association information to produce a modified session packet, in block 1510. In either case, the AIPR forwards the modified session packet based on the modified destination address, in block 1512.

Stateful routing can be accomplished without presuming that each AIPR has a priori knowledge of the other AIPRs in the network in relation to the network/next hop associations contained in its routing information base. For example, a particular AIPR may not know the next waypoint AIPR (if any) to use for the destination network address. Rather, each waypoint AIPR can determine the presence or absence of a next waypoint AIPR after forwarding a modified lead packet.

By way of example with reference to FIG. 8, assuming AIPR 1 708 receives the original lead packet 801 from source client node 726, AIPR 1 708 identifies the lead packet 801 as the lead packet for a new session as discussed above, and also determines that the lead packet 801 is not a modified lead packet containing session metadata. Therefore, AIPR 1 708 determines that it is the first waypoint AIPR for the session. AIPR 1 708 stores information from the received lead packet 801, such as the source address, the source port number, the destination port number, and the protocol identifier.

Since AIPR 1 708 is the first waypoint AIPR, AIPR 1 708 is able to determine that future session-related packets received from the source client node 726 will have a source address (SA) of 1.1.1.1; a source port number of 10; a destination address of 5.5.5.5; a destination port number of 20; and a protocol identifier of 100.

To forward a modified lead packet, AIPR 1 708 does not know whether or not there is a next hop AIPR through which the modified lead packet will traverse. Therefore, rather than changing both the source address field and the destination address field in the lead packet, AIPR 1 708 may change just the source address field to be the network address of AIPR 1 708 (i.e., 2.2.2.2) and may insert any assigned source and destination port numbers as metadata rather than inserting the assigned source and destination port numbers in the source and destination port number fields of the modified lead packet and carrying the original source and destination port numbers as metadata as in the exemplary embodiment discussed above. Thus, for example, the modified lead packet transmitted by AIPR 1 708 may include the following information:

| | | |
|---|---|---|
| SA | 2.2.2.2 | |
| SP | 10 | |
| DA | 5.5.5.5 | |
| DP | 20 | |
| PR | 100 | |
| SSP | 30 | (session source port number assigned by AIPR 1 708) |
| SDP | 40 | (session destination port number assigned by AIPR 1 708) |

In this way, the modified lead packet transmitted by AIPR 1 708 will be routed based on the destination address of 5.5.5.5 and therefore may or may not traverse another AIPR on its way to destination service node 728. At this point, AIPR 1 708 does not know the destination address that will be used for session-related packets forwarded over an outgoing interface (since AIPR 1 708 does not determine until later whether or not it is the final waypoint AIPR between the source client node 726 and the destination service node 728).

Assume that the modified lead packet transmitted by AIPR 1 708 reaches AIPR 2 714. AIPR 2 714 identifies the modified lead packet as a lead packet for a new session as discussed above, and also determines that the modified lead packet is a modified lead packet containing session metadata. Therefore, AIPR 2 714 determines that it is not the first waypoint AIPR for the session. At this time, AIPR 2 714 is unable to determine whether or not it is the final waypoint AIPR for the session. AIPR 2 714 stores information from the received modified lead packet, such as the source address, the source port number, the destination port number, and the protocol identifier.

Since AIPR 2 714 is not the first waypoint AIPR, AIPR 2 714 is able to determine that future session-related packets received from AIPR 1 708 will have a source address (SA) of 2.2.2.2; a source port number of 30 (i.e., the SSP assigned by AIPR 1 708); destination address of 3.3.3.3; a destination port number of 40 (i.e., the SDP assigned by AIPR 1 708); and a protocol identifier of 100.

To forward a modified lead packet, AIPR 2 714 does not know whether or not there is a next hop AIPR through which the modified lead packet will traverse. Therefore, rather than changing both the source address field and the destination address field in the lead packet, AIPR 2 714 may change just the source address field to be the network address of AIPR 2 714 (i.e., 3.3.3.3) and may insert any assigned source and destination port numbers as metadata rather than inserting the assigned source and destination port numbers in the source and destination port number fields of the modified lead packet and carrying the original source and destination port numbers as metadata as in the exemplary embodiment discussed above. Thus, for example, the modified lead packet transmitted by AIPR 2 714 may include the following information:

| | | |
|---|---|---|
| SA | 3.3.3.3 | |
| SP | 10 | |
| DA | 5.5.5.5 | |
| DP | 20 | |
| PR | 100 | |
| SSP | 50 | (session source port number assigned by AIPR 2 714) |
| SDP | 60 | (session destination port number assigned by AIPR 2 714) |

In this way, the modified lead packet transmitted by AIPR 2 714 will be routed based on the destination address of 5.5.5.5 and therefore may or may not traverse another AIPR on its way to destination service node 728. At this point, AIPR 2 714 does not know the destination address that will be used for session-related packets forwarded over an outgoing interface (since AIPR 2 714 does not determine until later whether or not it is the final waypoint AIPR between the source client node 726 and the destination service node 728).

At some point, AIPR 2 714 identifies itself to AIPR 1 708 as a waypoint AIPR for the session (e.g., upon receipt of the modified lead packet from AIPR 1 708 or in a return packet associated with the session). This allows AIPR 1 708 to determine that it is not the final waypoint AIPR and therefore also allows AIPR 1 708 to determine the forward association parameters to use for forwarding session-related packets, i.e., AIPR 1 708 is able to determine that future session-related packets sent to AIPR 2 714 will have a source address (SA) of 2.2.2.2; a source port number of 30 (i.e., the SSP assigned by AIPR 1 708); destination address of 3.3.3.3; a destination port number of 40 (i.e., the SDP assigned by AIPR 1 708); and a protocol identifier of 100.

Assume that the modified lead packet transmitted by AIPR 2 714 reaches AIPR 4 722. AIPR 4 722 identifies the modified lead packet as a lead packet for a new session as discussed above, and also determines that the modified lead packet is a modified lead packet containing session metadata. Therefore, AIPR 4 722 determines that it is not the first waypoint AIPR for the session. At this time, AIPR 4 722 is unable to determine whether or not it is the final waypoint AIPR for the session. AIPR 4 722 stores information from the received modified lead packet, such as the source address, the source port number, the destination port number, and the protocol identifier.

Since AIPR 4 722 is not the first waypoint AIPR, AIPR 4 722 is able to determine that future session-related packets received from AIPR 2 714 will have a source address (SA) of 3.3.3.3; a source port number of 50 (i.e., the SSP assigned by AIPR 2 714); destination address of 4.4.4.4; a destination port number of 60 (i.e., the SDP assigned by AIPR 2 714); and a protocol identifier of 100.

To forward a modified lead packet, AIPR 4 722 does not know whether or not there is a next hop AIPR through which the modified lead packet will traverse. Therefore, rather than changing both the source address field and the destination address field in the lead packet, AIPR 4 722 may change just the source address field to be the network address of AIPR 4 722 (i.e., 4.4.4.4) and may insert any assigned source and destination port numbers as metadata rather than inserting the assigned source and destination port numbers in the source and destination port number fields of the modified lead packet and carrying the original source and destination port numbers as metadata as in the exemplary embodiment discussed above. Thus, for example, the modified lead packet transmitted by AIPR 4 722 may include the following information:

| | | |
|---|---|---|
| SA | 4.4.4.4 | |
| SP | 10 | |
| DA | 5.5.5.5 | |
| DP | 20 | |
| PR | 100 | |
| SSP | 70 | (session source port number assigned by AIPR 4 722) |
| SDP | 80 | (session destination port number assigned by AIPR 4 722) |

In this way, the modified lead packet transmitted by AIPR 4 722 will be routed based on the destination address of 5.5.5.5 and therefore may or may not traverse another AIPR on its way to destination service node 728. At this point, AIPR 4 722 does not know the destination address that will be used for session-related packets forwarded over an outgoing interface (since AIPR 4 722 does not determine until later whether or not it is the final waypoint AIPR between the source client node 726 and the destination service node 728).

At some point, AIPR 4 722 identifies itself to AIPR 2 714 as a waypoint AIPR for the session (e.g., upon receipt of the modified lead packet from AIPR 2 714 or in a return packet associated with the session). This allows AIPR 2 714 to determine that it is not the final waypoint AIPR and therefore also allows AIPR 2 714 to determine the forward association parameters to use for forwarding session-related packets, i.e., AIPR 2 714 is able to determine that future session-related packets sent to AIPR 4 722 will have a source address (SA) of 3.3.3.3; a source port number of 50 (i.e., the SSP assigned by AIPR 2 714); destination address of 4.4.4.4; a destination port number of 60 (i.e., the SDP assigned by AIPR 2 714); and a protocol identifier of 100.

Assume that the modified lead packet transmitted by AIPR 4 722 reaches the destination service node 728, which processes the modified lead packet without reference to the session metadata contained in the packet. Typically, this includes the destination device sending a reply packet back toward the source client node 726.

Since AIPR 4 722 receives a packet from the destination service node 728, as opposed to another waypoint AIPR, AIPR 4 722 is able to determine that it is the final waypoint AIPR and therefore also is able to determine the forward association parameters to use for forwarding session-related packets, i.e., AIPR 4 722 is able to determine that future session-related packets sent to the destination service node 728 will have a source address (SA) of 4.4.4.4; a source port number of 10 (i.e., the original SP); a destination address of 5.5.5.5; a destination port number of 20 (i.e., the original DP); and a protocol identifier of 100.

After the lead packet has been processed and the session-related information has been established by the waypoint AIPRs hop-by-hop from the source client node 726 to the destination service node 728, additional packets may be exchanged between the source client node 726 and the destination service node 728 to establish an end-to-end communication session between the source client node 726 and the destination service node 728.

Lead Packet Identification in Stateful Session

As noted above, a waypoint should be able to identify a lead packet of a session. Various techniques may be used to identify lead packets. Some of these techniques are protocol-specific. For example, a TCP session is initiated according to a well-known three-part handshake involving a SYN packet, a SYN-ACK packet and an ACK packet. By statefully following packet exchanges between pairs of nodes, a waypoint can identify a beginning of a session and, in many cases, an end of the session. For example, a TCP session may be ended by including a FIN flag in a packet and having the other node send an ACK, or by simply including an RST flag in a packet. Because each waypoint stores information about each session, such as the source/destination network address and port number pairs, the waypoint can identify the session with which each received packet is associated. The waypoint can follow the protocol state of each session by monitoring the messages and flags, such as SYN and FIN, sent by the endpoints of the session and storing state information about each session in its database.

It should be noted that a SYN packet may be re-transmitted—each SYN packet does not necessarily initiate a separate session. However, the waypoint can differentiate between SYN packets that initiate a session and re-transmitted SYN packets based on, for example, the response packets.

Where a protocol does not define a packet sequence to end a session, the waypoint may use a timer. After a predetermined amount of time, during which no packet is handled for a session, the waypoint may assume the session is ended. Such a timeout period may also be applied to sessions using protocols that define end sequences.

The following table describes exemplary techniques for identifying the beginning and end of a session, according to various protocols. Similar techniques may be developed for other protocols, based on the definitions of the protocols.

| Protocol | Destination Port | Technique for Start/End Determination |
|---|---|---|
| TCP | Any | Detect start on the first SYN packet from a new address/port unique within the TCP protocol's guard time between address/port reuse. Following the TCP state machine to determine an end (FIN exchange, RST, or guard timeout). |
| UDP-TFTP | 69 | Trap on the first RRQ or WRQ message to define a new session, trap on an undersized DAT packet for an end of session. |
| UDP-SNMP | 161, 162 | Trap on the message type, including GetRequest, SetRequest, GetNextRequest, GetBulkRequest, InformRequest for a start of session, and monitor the Response for end of session. For SNMP traps, port 162 is used, and the flow of data generally travels in the "reverse" direction. |
| UDP-SYSLOG | 514 | A single message protocol, thus each message is a start of session, and end of session. |
| UDP-RTP | Any | RTP has a unique header structure, which can be reviewed/analyzed to identify a start of a session. This is not always accurate, but if used in combination with a guard timer on the exact same five-tuple address, it should work well enough. The end of session is detected through a guard timer on the five-tuple session, or a major change in the RTP header. |
| UDP-RTCP | Any | RTCP also has a unique header, which can be reviewed, analyzed, and harvested for analytics. Each RTCP packet is sent periodically and can be considered a "start of session" with the corresponding RTCP response ending the session. This provides a very high quality way of getting analytics for RTCP at a network middle point, without using a Session Border Controller. |
| UDP-DNS (Nameserver) | 53 | Each DNS query is a single UDP message and response. By establishing a forward session (and subsequent backward session) the Augmented router gets the entire transaction. This allows analytics to be gathered and manipulations that are appropriate at the Augmented router. |
| UDP-NTP | 123 | Each DNS query/response is a full session. So, each query is a start, and each response is an end. |

Figure 16:
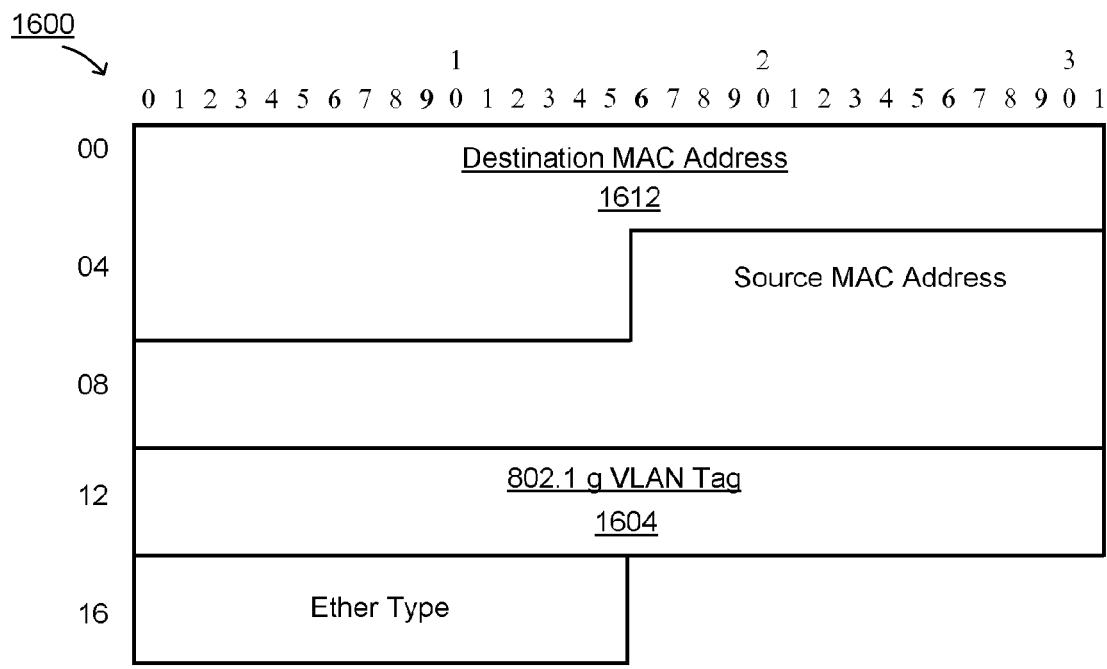
FIG. 16 schematically shows a layout of an Ethernet header, identifying fields used for identifying a beginning of a session, in accordance with one exemplary embodiment.

FIG. 16 is a schematic layout of an Ethernet header 1600, including a Destination MAC Address 1602 and an 802.1q VLAN Tag 1604.

Figure 17:
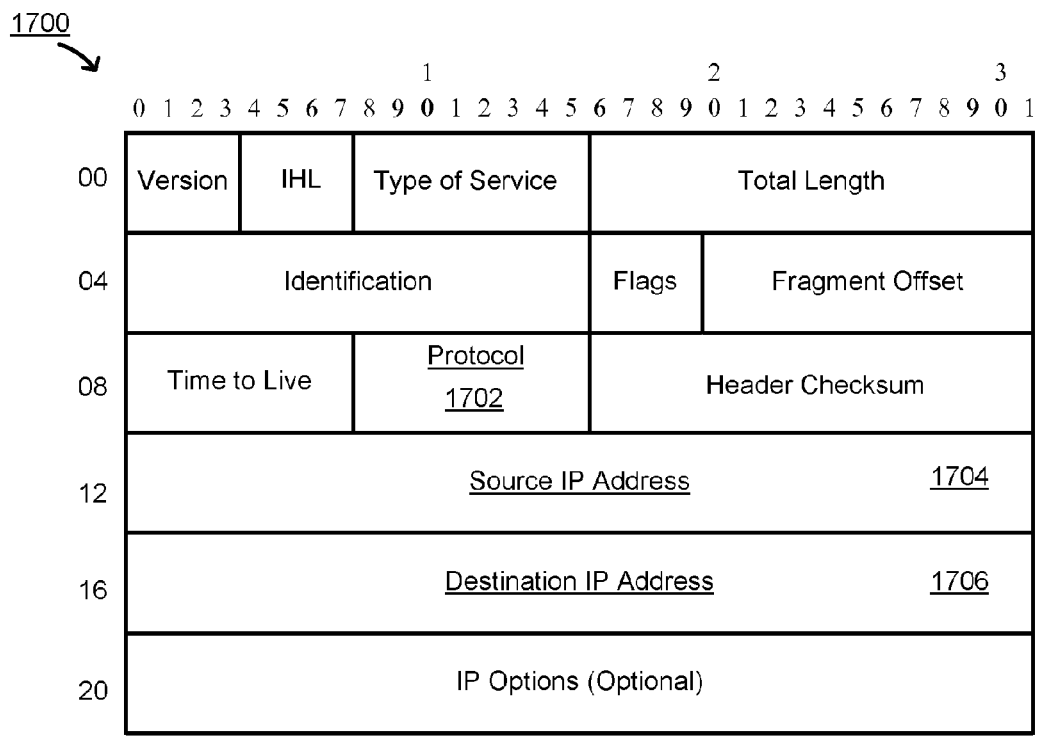
FIG. 17 schematically shows a layout of an IP header, identifying fields used for identifying a beginning of a session, in accordance with one exemplary embodiment.

FIG. 17 is a schematic layout of an IPv4 header 1700, including a Protocol field 1702, a Source IP Address 1704 and a Destination IP Address 1706. There are two commonly-used versions of IP, namely IP version 4 ("IPv4") and IP version 6 ("IPv6"). IPv4 is described in IETF RFC 791, which is hereby incorporated herein by reference in its entirety. IPv6 is described in IETF RFC 2460, which is hereby incorporated herein by reference in its entirety. The main purpose of both versions is to provide unique global computer addressing to ensure that communicating devices can identify one another. One of the main distinctions between IPv4 and IPv6 is that IPv4 uses 32-bit IP addresses, whereas IPv6 utilizes 128 bit IP addresses. In addition, IPv6 can support larger datagram sizes.

Figure 18:
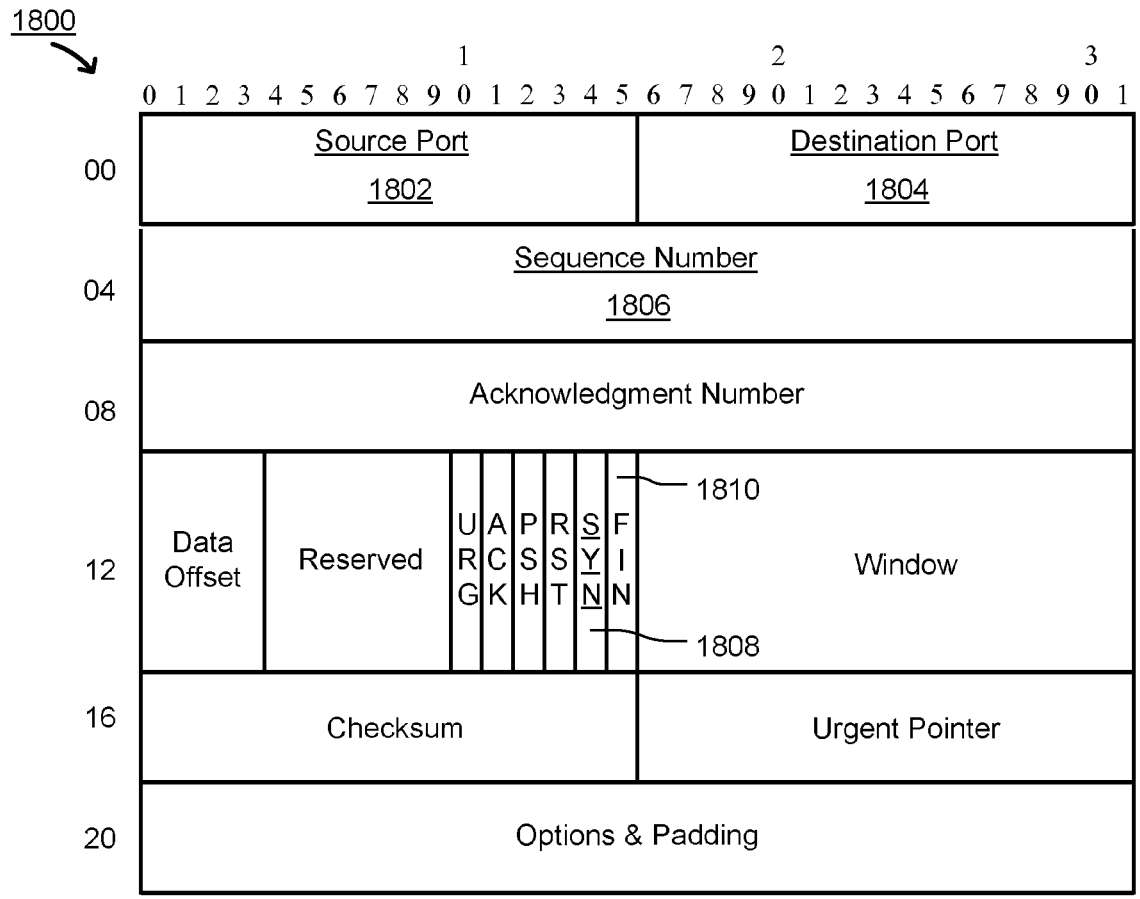
FIG. 18 schematically shows a layout of a TCP header, identifying fields used for identifying a beginning of a session, in accordance with one exemplary embodiment.

FIG. 18 is a schematic layout of a TCP header 1800, including a Source Port 1802, a Destination Port 1804, a Sequence Number 1806, a SYN flag 1808 and a FIN flag 1810. TCP is described generally in IETF RFC 793, which is hereby incorporated herein by reference in its entirety. Similar to TCP, the UDP header includes a Source Port field and a Destination Port field. UDP is described generally in IETF RFC 768, which is hereby incorporated herein by reference in its entirety.

These packets and the identified fields may be used to identify the beginning of a session, as summarized in the following table.

| Data Item | Where From | Description |
|---|---|---|
| Physical Interface | Ethernet Header | This is the actual port that the message was received on, which can be associated or discerned by the Destination MAC Address |
| Tenant | Ethernet Header OR Source MAD Address & Previous Advertisement | Logical association with a group of computers. |
| Protocol | IP Header | This defines the protocol in use and, for the TCP case, it must be set to a value that corresponds to TCP |
| Source IP Address | IP Header | Defines the source IP Address of the initial packet of a flow. |
| Destination IP Address | IP Header | Defines the destination IP Address of the initial packet of a flow. |
| Source Port | TCP or UDP Header | Defines the flow instance from the source. This may reflect a client, a firewall in front of the client, or a carrier grade NAT. |
| Destination Port | TCP or UDP Header | This defines the desired service requested, such as 80 for HTTP. |
| Sequence Number | TCP Header | This is a random number assigned by the client. It may be updated by a firewall or carrier grade NAT. |
| SYN Bit On | TCP Header | When the SYN bit is on, and no others, this is an initial packet of a session. It may be retransmitted if there is no response to the first SYN message. |

The lead packet, and hence the session identifying information, can include information from a single field or can include information from multiple fields. In certain exemplary embodiments, sessions are based on a "5-tuple" of information including the source IP address, source port number, destination IP address, destination port number, and protocol from the IP and TCP headers.

Augmented IP Router (AIPR)

Figure 19:
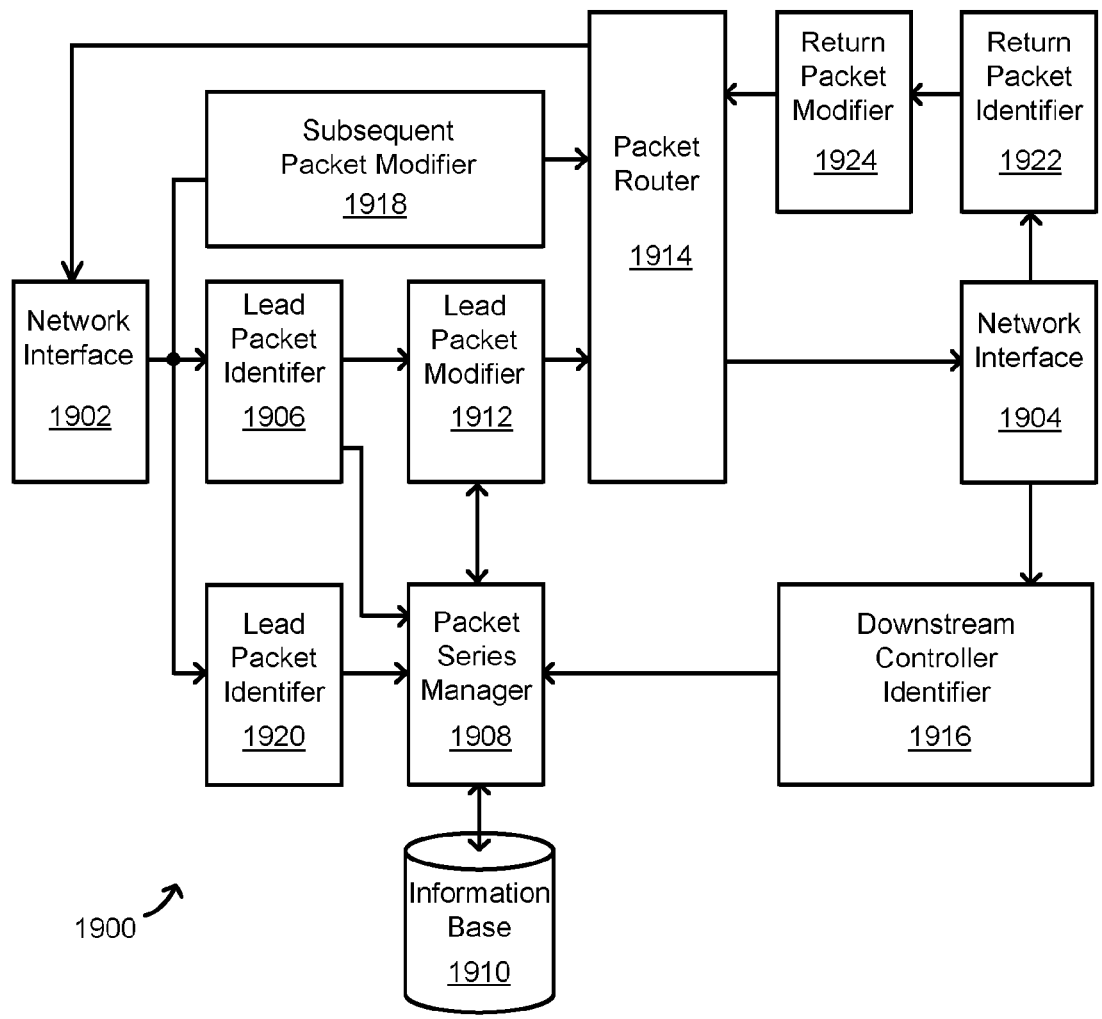
FIG. 19 schematically shows a block diagram of an AIPR of FIG. 7, in accordance with one exemplary embodiment.

FIG. 19 is a schematic block diagram of an exemplary AIPR (waypoint) 1900 configured in accordance with illustrative embodiments of the invention. The AIPR 1900 includes at least two network interfaces 1902 and 1904, through which the AIPR 1900 may be coupled to two networks. The interfaces 1902 and 1904 may be, for example, Ethernet interfaces. The AIPR 1900 may send and receive packets via the interfaces 1902 and 1904.

A lead packet identifier 1906 automatically identifies lead packets, as discussed herein. In general, the lead packet identifier 1906 identifies a lead packet when the lead packet identifier 1906 receives a packet related to a session that is not already represented in the AIPR's information base 1910, such as a packet that identifies a new source client/destination service network address/port number pair. As noted, each lead packet is an initial, non-dropped, packet of a series of packets (session). Each session includes a lead packet and at least one subsequent packet. The lead packet and all the subsequent packets are sent by the same source client toward the same destination service, for forward flow control. For forward and backward flow control, all the packets of the session are sent by either the source client or the destination service toward the other.

A session (packet series) manager 1908 is coupled to the lead packet identifier 1906. For each session, the session manager assigns a unique identifier. The unique identifier may be, for example, a combination of the network address of the AIPR 1900 or of the interface 1902, in combination with a first port number assigned by the session manager 1908 for receiving subsequent packets of this session. The unique identifier may further include the network address of the AIPR 1900 or of the other interface 1904, in combination with a second port number assigned by the session manager 1908 for transmitting the lead packet and subsequent packets. This unique identifier is associated with the session. The session manager 1908 stores information about the session in an information base 1910. This information may include the unique identifier, in association with the original source client/destination service network address/port number pairs.

Figure 20:
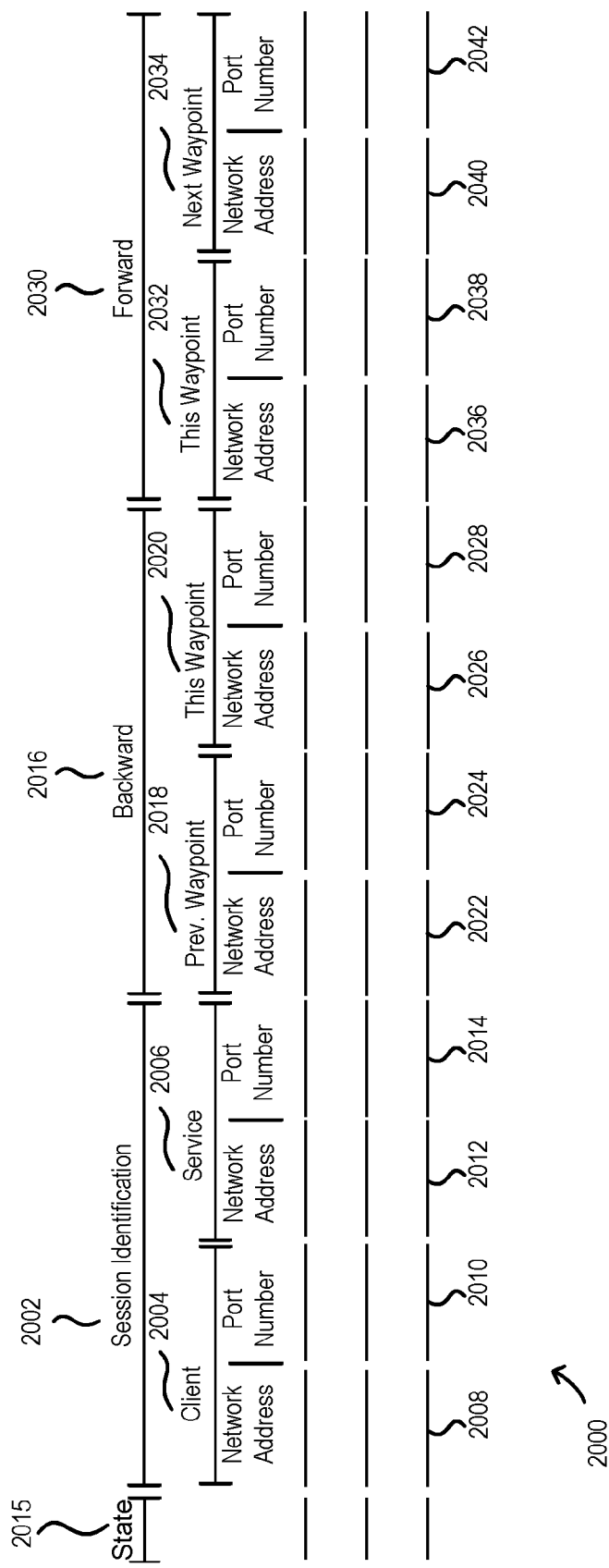
FIG. 20 shows a schematic illustration of information stored in an information base by the AIPR of FIGS. 7 and 19, in accordance with one exemplary embodiment.

FIG. 20 is a schematic layout of an exemplary waypoint information base 2000. Each row represents a session. A session identification column 2002 includes sub-columns for the source client 2004 and the destination service 2006. For each client 2004, its network address 2008 and port number 2010 are stored. For each destination service 2006, its network address 2012 and port number 2014 are stored. This information is extracted from the lead packet.

State information about the session may be stored in a state column 2015. This information may be used to statefully follow a series of packets, such as when a session is being initiated or ended.

A backward column includes sub-columns for storing information 2016 about a portion of the backward path, specifically to the previous AIPR. The backward path information 2016 includes information 2018 about the previous AIPR and information 2020 about the present AIPR 1900. The information 2018 about the previous AIPR includes the AIPR's network address 2022 and port number 2024. The session manager 1908 extracts this information from the lead packet, assuming the lead packet was forwarded by an AIPR. If, however, the present AIPR 1900 is the first AIPR to process the lead packet, the information 2018 is left blank as a flag. The information 2020 about the present AIPR 1900 includes the network address 2026 of the interface 1902 over which the lead packet was received, as well as the first port number 2028 assigned by session manager 1908.

The waypoint information base 2000 is also configured to store information 2030 about a portion of the forward path (of a session), specifically to the next AIPR. This information 2030 includes information 2032 about the present AIPR 1900 and information 2034 about the next AIPR along the path, assuming there is a next AIPR. The information 2032 includes the network address 2036 of the interface over which the present AIPR will send the lead packet and subsequent packets, as well as the second port number 2038 assigned by the session manager 1908. The information 2034 about the next AIPR along the path may not yet be available, unless the AIPR is provisioned with information about the forward path. The information 2034 about the next AIPR includes its network address 2040 and port number 2042. If the information 2034 about the next AIPR is not yet available, the information 2034 may be filled in when the AIPR 1900 processes a return packet, as described below, or as when determined using the process of FIG. 5.

Some embodiments of the waypoint information base 2000 may include the forward information 2030 without the backward information 2016. Other embodiments of the waypoint information base 2000 may include the backward information 2016 without the forward information 2030. Statistical information may be gathered and/or calculated using either or both forward and backward information 2016.

Returning to FIG. 19, a lead packet modifier 1912 is coupled to the session manager 1908. The lead packet modifier 1912 modifies the lead packet to store the unique identifier associated with the session. The original source client network address/port number pair, and the original destination service network address/port number pair, are stored in the modified lead packet, if necessary. The lead packet may be enlarged to accommodate the additional information stored therein, or existing space within the lead packet, such a vendor specific attribute field, may be used. Other techniques for transmitting additional information are protocol specific, for example with TCP, the additional information could be transmitted as a TCP Option field, or added to the SYN packet as data. In either case, the term session data block is used to refer to the information added to the modified lead packet.

Figure 21:
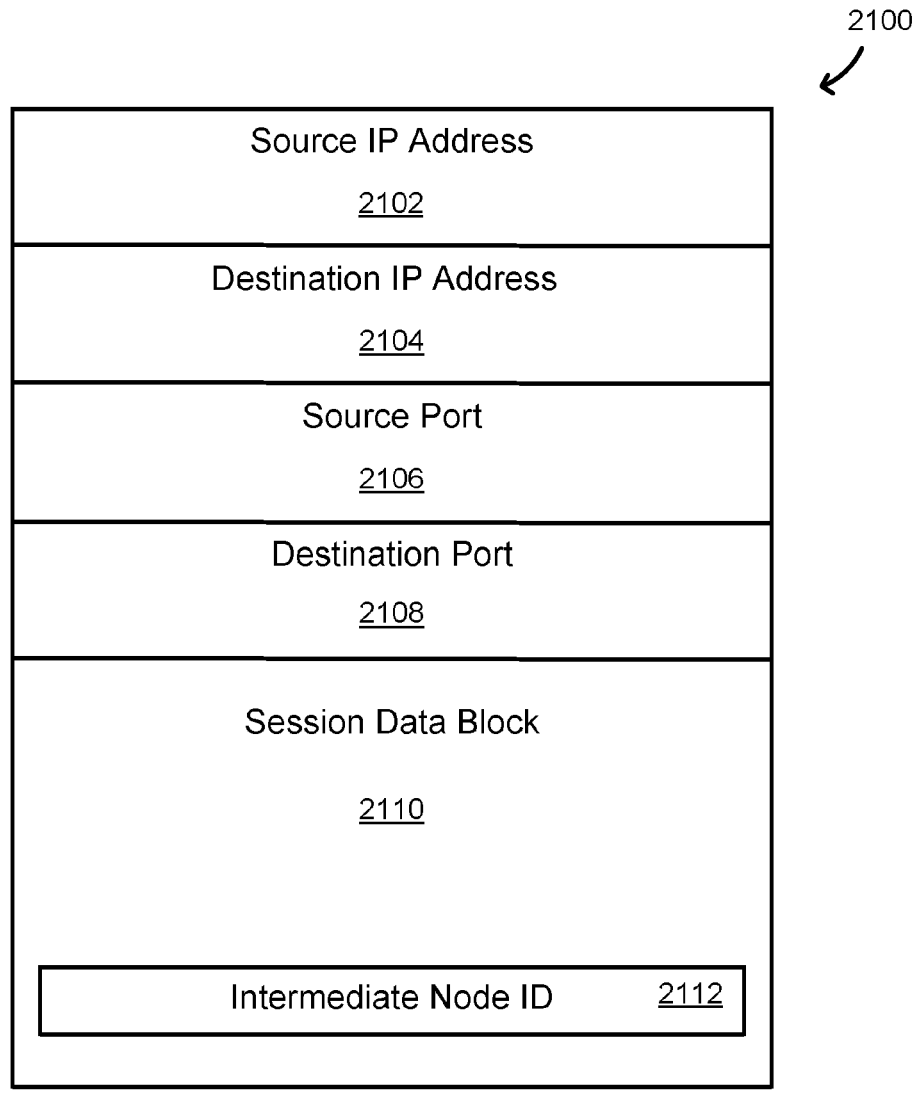
FIG. 21 schematically shows a modified lead packet produced by the AIPR of FIGS. 7 and 19, in accordance with one exemplary embodiment.

FIG. 21 is a schematic diagram of an exemplary modified lead packet 2100 showing the original source and destination IP addresses 2102 and 2104, respectively, and the original source and destination port numbers 2106 and 2108, respectively. FIG. 21 also shows a session data block 2110 in the modified lead packet 2100. Although the session data block 2110 is shown as being contiguous, it may instead have its contents distributed throughout the modified lead packet 2100. The session data block 2110 may store an identification of the sending AIPR, i.e., an intermediate node identifier 2112, such as the network address of the second network interface 2104 and the second port number.

Returning to FIG. 21, the lead packet modifier 2112 updates the packet length, if necessary, to reflect any enlargement of the packet. The lead packet modifier 2112 updates the checksum of the packet to reflect the modifications made to the packet. The modified lead packet is then transmitted by a packet router 1914, via the second network interface 1904. The modified lead packet is naturally routed, unless the AIPR 1900 has been provisioned with forward path information.

Eventually, the destination service sends a return packet. The AIPR 1900 receives the return packet via the second interface 1904. If another AIPR (downstream AIPR) between the present AIPR 1900 and the destination service handles the lead packet and the return packet, the downstream AIPR modifies the return packet to include the downstream AIPR's network address and a port number. A downstream controller 1916 identifier uses stateful inspection, as described herein, to identify the return packet. The downstream controller 1916 stores information 2034 (FIG. 20), specifically the network address and port number, about the next AIPR in the waypoint information base 2000. The present AIPR 1900 may use this information to address subsequent packets to the next AIPR. Specifically, a subsequent packet modifier 1918 may set the destination address of the subsequent packets to the network address and port number 2040 and 2042 (FIG. 20) of the next waypoint, instead of directly to the destination service. The packet router 1914 sends the subsequent packets, according to their modified destination addresses. Thus, for each series of packets, subsequent packets flow through the same downstream packet flow controllers as the lead packet of the series of packets.

A last packet identifier 1920 statefully follows each session, so as to identify an end of each stream, as discussed above. As noted, in some cases, the end is signified by a final packet, such as a TCP packet with the RST flag set or a TCP ACK packet in return to a TCP packet with the FIN flag set. In other cases, the end may be signified by a timer expiring. When the end of a session is detected, the packet series manager 1908 disassociates the unique identifier from the session and deletes information about the session from the waypoint information base 2000.

Where the AIPR 1900 is provisioned to be a last AIPR before a destination service, the lead packet modifier 1906 restores the lead packet to the state the lead packet was in when the source client sent the lead packet, or as the lead packet was modified, such as a result of network address translation (NAT). Similarly, the subsequent packet modifier 1918 restores subsequent packets.

Similarly, if the destination address of the lead packet is the same as the network address of the AIPR 1900, or its network interface 1902 over which it receives the lead packets, the lead packet modifier 1906 and the subsequent packet modifier 1918 restore the packet and subsequent packets.

As noted, in some protocols, several packets are required to initiate a session, as with the SYN-SYN/ACK-ACK handshake of the TCP. Thus, the downstream controller identifier 1916 may wait until a second return packet is received from the destination service before considering a session as having started.

As noted, some embodiments of the waypoint 1900 also manage return packet paths. The lead packet identifier 1906 automatically ascertains whether a lead packet was forwarded to the waypoint 1900 by an upstream waypoint. If the lead packet includes a session data block, an upstream waypoint forwarded the lead packet. The packet series manager 1908 stores information about the upstream waypoint in the waypoint information base 1910. A return packet identifier 1922 receives return packets from the second network interface 1904 and automatically identifies return packets of the session. These return packets may be identified by destination address and port number being equal to the information 2032 (FIG. 20) in the waypoint information base corresponding to the session. A return packet modifier modifies the return packets to address them to the upstream waypoint for the session, as identified by the information 2018 in the waypoint information base 2000.

Figure 22:
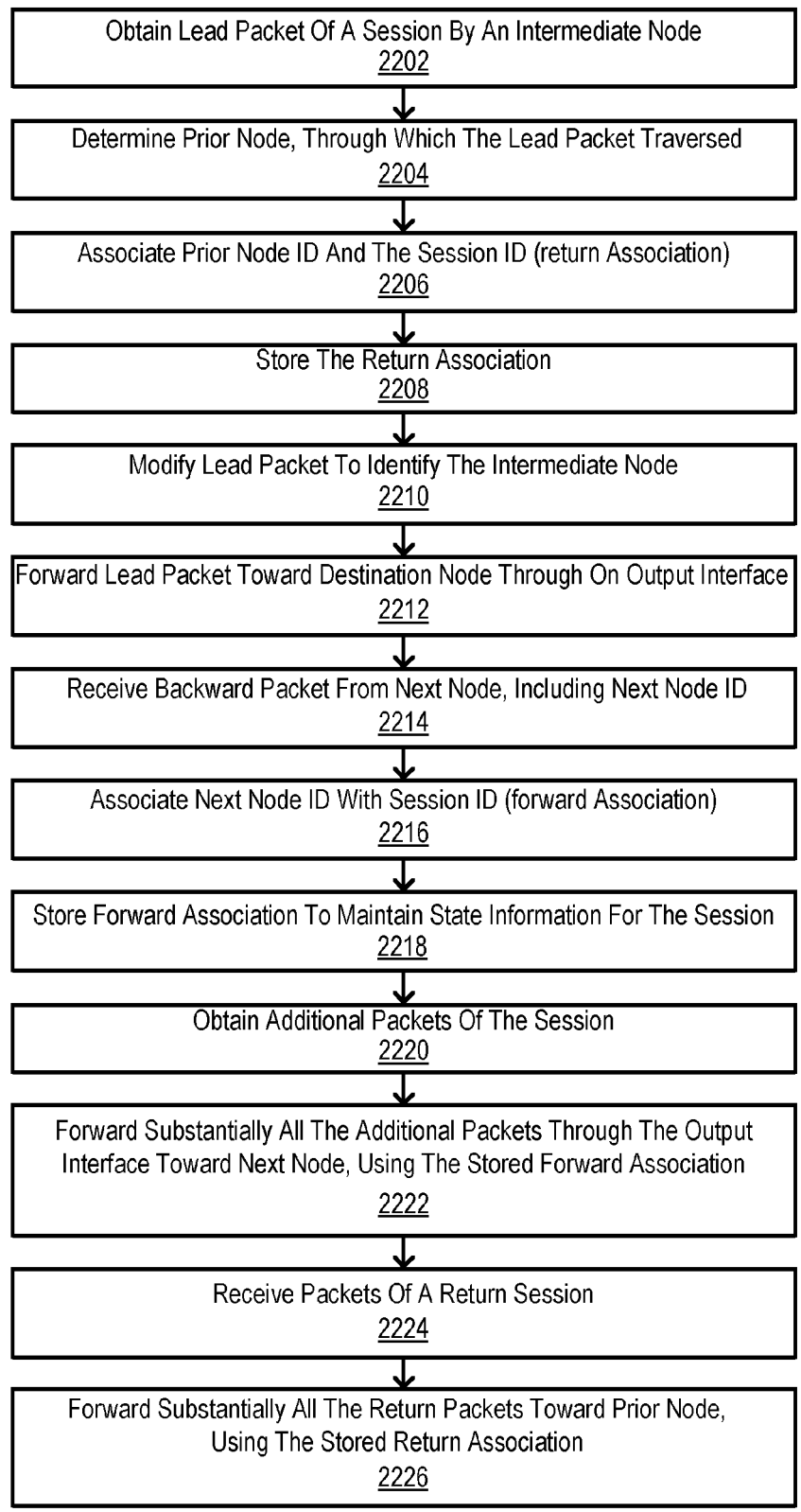
FIG. 22 is a flowchart illustrating some of the operations performed by the AIPR of FIGS. 7 and 19, in accordance with one exemplary embodiment.

FIG. 22 shows a flowchart schematically illustrating some operations performed by the AIPR 1900 (FIG. 19) in accordance with illustrative embodiments of the invention. The flowchart illustrates a packet routing method for directing packets of a session from an originating node toward a destination node in an IP network. At 2202, an intermediate node obtains a lead packet of a plurality of packets in a session. The intermediate node may include a routing device or a switching device that performs a routing function.

The packets in the session have a unique session identifier. At 2204, a prior node, through which the lead packet traversed, is determined. The prior node has a prior node identifier. At 2206, a return association is formed between the prior node identifier and the session identifier. At 2208, the return association is stored in memory to maintain state information for the session.

At 2210, the lead packet is modified to identify at least the intermediate node. At 2212, the lead packet is forwarded toward the destination node though an intermediate node electronic output interface to the IP network. The next hop node may be determined any number of ways, including using the process of FIG. 5. The electronic output interface is in communication with the IP network. At 2214, a backward message (e.g., a packet, referred to as a "backward packet") is received through an electronic input interface of the intermediate node. The backward message is received from a next node having a next node identifier. The backward message includes the next node identifier and the session identifier. The electronic input interface is in communication with the IP network.

At 2216, a forward association is formed between the next node identifier and the session identifier. At 2218, the forward association is stored in memory, to maintain state information for the session. At 2220, additional packets of the session are obtained. At 2222, substantially all of the additional packets in the session are forwarded toward the next node, using the stored forward association. The additional packets are forwarded through the electronic output interface of the intermediate node.

At 2224, a plurality of packets is received in a return session, or a return portion of the session, from the destination. The return session is addressed toward the originating node. At 2226, substantially all the packets in the return session are forwarded toward the prior node, using the stored return association. The packets are forwarded through the electronic output interface.

Figure 23:
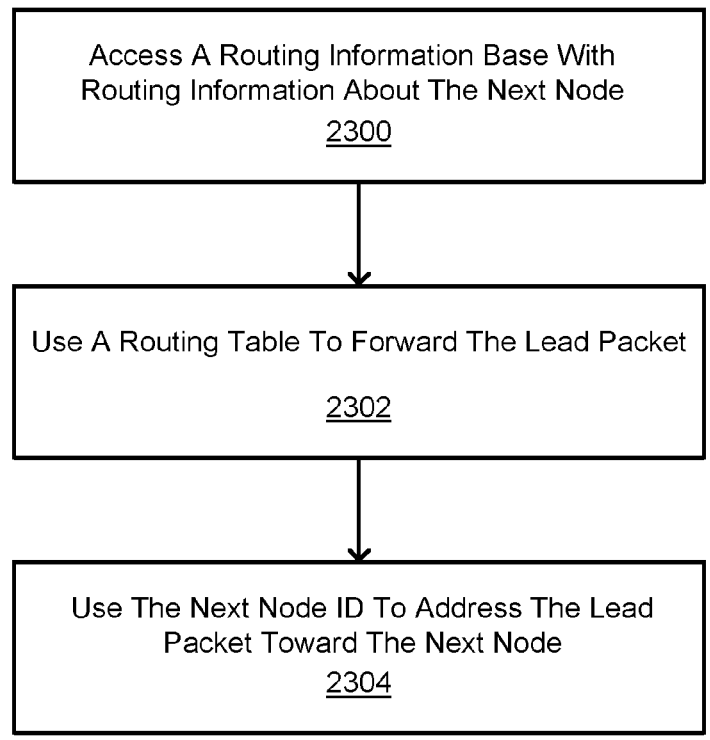
FIG. 23 is a flowchart illustrating some of the operations involved with forwarding a lead packet, in accordance with one exemplary embodiment.

FIG. 23 shows a high-level alternative process of managing the lead packet when establishing a session. As shown at 2300, forwarding the lead packet 2212 toward the destination node may include accessing a routing information base having routing information for the next hop node and other potential next nodes. As shown at 2302, the intermediate node may have a routing table, and forwarding the lead packet 2212 toward the destination node may include using the routing table to forward the lead packet toward the destination node and next hop node. As shown at 2304, forwarding the lead packet 2212 toward the destination node may include using the next node identifier to address the lead packet toward the next hop node. The lead packet may be addressed so that a plurality of network devices receives the lead packet after it is forwarded and before the next hop node receives the lead packet.

In a manner similar to other components discussed above, the AIPR 1900 and all or a portion of its components 1902-1924 may be implemented by a processor executing instructions stored in a memory, hardware (such as combinatorial logic, Application Specific Integrated Circuits (ASICs), Field-Programmable Gate Arrays (FPGAs) or other hardware), firmware or combinations thereof.

Various embodiments of the invention may be implemented at least in part in any conventional computer programming language. For example, some embodiments may be implemented in a procedural programming language (e.g., "C"), or in an object oriented programming language (e.g., "C++"). Other embodiments of the invention may be implemented as a pre-configured, stand-along hardware element and/or as preprogrammed hardware elements (e.g., application specific integrated circuits, FPGAs, and digital signal processors), or other related components.

In an alternative embodiment, the disclosed apparatus and methods (e.g., see the various flow charts described above) may be implemented as a computer program product for use with a computer system. Such implementation may include a series of computer instructions fixed either on a tangible, non-transitory medium, such as a computer readable medium (e.g., a diskette, CD-ROM, ROM, or fixed disk). The series of computer instructions can embody all or part of the functionality previously described herein with respect to the system.

Those skilled in the art should appreciate that such computer instructions can be written in a number of programming languages for use with many computer architectures or operating systems. Furthermore, such instructions may be stored in any memory device, such as semiconductor, magnetic, optical or other memory devices, and may be transmitted using any communications technology, such as optical, infrared, microwave, or other transmission technologies.

Among other ways, such a computer program product may be distributed as a removable medium with accompanying printed or electronic documentation (e.g., shrink wrapped software), preloaded with a computer system (e.g., on system ROM or fixed disk), or distributed from a server or electronic bulletin board over the network (e.g., the Internet or World Wide Web). In fact, some embodiments may be implemented in a software-as-a-service model ("SAAS") or cloud computing model. Of course, some embodiments of the invention may be implemented as a combination of both software (e.g., a computer program product) and hardware. Still other embodiments of the invention are implemented as entirely hardware, or entirely software.

Although the above discussion discloses various exemplary embodiments of the invention, it should be apparent that those skilled in the art can make various modifications that will achieve some of the advantages of the invention without departing from the true scope of the invention.

What is claimed is:

1. A method of establishing a session across a plurality of nodes in a computer network, the plurality of nodes including a current node and a plurality of next nodes, each one of the plurality of next nodes being coupled with the current node via a link, the method comprising:

determining residual capacities of the links between the current node and the plurality of next nodes, wherein residual capacity corresponds to amount of network flow capacity remaining in a respective link, at a given point in time, not in use or otherwise reserved;

determining a sum of the residual capacities of the links between the current node and the plurality of next nodes;

generating a random number from a range of numbers, the range of numbers being a function of the sum of the residual capacities of the links between the current node and the plurality of next nodes;

selecting one of the plurality of next nodes as a function of the random number and the residual capacities of the links between the current node and the plurality of next nodes, the selected next node being a next hop node; and directing packets for the session from the current node to the next hop node.

2. The method as defined by claim 1 wherein each one of the plurality of next nodes is assigned a set of zero or more unique node values, each unique node value being a function of at least one number from the range of numbers, the total number of unique node values in the sets being a function of the residual capacities in the links between the current node and the plurality of next nodes, further wherein selecting comprises selecting the next hop node as a function of the unique node values of the plurality of next nodes.

3. The method as defined by claim 1 further comprising determining cost of the plurality of links between the current node and the plurality of next nodes, further wherein selecting comprises selecting one of the plurality of next nodes as a function of the cost.

4. The method as defined by claim 1 wherein determining the residual capacities comprises using a maximum flow algorithm that determines the residual capacities of the links between the current node and the plurality of next nodes.

5. The method as defined by claim 1 wherein selecting comprises applying a weight to each one of the plurality of next nodes as a function of the residual capacities, and selecting one of the plurality of next nodes as a function of the weights of each one of the plurality of next nodes.

6. The method as defined by claim 1 wherein the plurality of nodes comprise a router.

7. The method as defined by claim 1 wherein determining the residual capacities comprises forming a network graph wherein the current node and the plurality of next nodes form vertices and the links comprise edges.

8. The method as defined by claim 1 wherein the next hop node is a new current node, the method repeating the acts of determining, generating, and selecting for a plurality of new current nodes in the computer network to a destination node, the method forming a network path through the computer network to the destination node for a given session, the method forwarding packets of the given session along the selected nodes to the destination node.

9. The method as defined by claim 1 wherein the current node receives a lead packet of a plurality of packets in the session, the method modifying the lead packet to identify the current node, and forwarding the lead packet toward a destination node, via the next hop node, to establish a stateful session.

10. The method as defined by claim 9 further wherein the current node receives a backward message from the next hop node, the current node storing information relating to the next hop node in memory to maintain state information for the stateful session.

11. The method as defined by claim 9 wherein the stateful session comprises packets traversing from the current node to the designation node via the next hop node, and packets traversing from the destination node to the current node via the next hop node.

12. An apparatus for establishing a session across a plurality of nodes in a computer network, the plurality of nodes including a current node and a plurality of next nodes, each one of the plurality of next nodes being coupled with the current node via a link, the apparatus comprising:

a random number generator configured to generate a random number;

a capacity calculator operatively coupled with the random number generator, the capacity calculator being configured to determine residual capacities of the links between the current node and the plurality of next nodes, wherein residual capacity corresponds to amount of network flow capacity remaining in a respective link, at a given point in time, not in use or otherwise reserved;

the random number generator is configured to generate the random number from a range of numbers, the range of numbers being a function of a sum of the residual capacities of the links between the current node and the plurality of next nodes;

a link selector operatively coupled with the random number generator, the link selector being configured to select one of the plurality of next nodes as a function of the random number and the residual capacities of the links between the current node and the plurality of next nodes, the one selected next node being a next hop node; and a router configured to direct packets for the session from the current node to the next hop node.

13. The apparatus as defined by claim 12 further comprising a routing database, the link selector associating, in the routing database, both the next hop node and the current node with the session.

14. The apparatus as defined by claim 12 the link selector is configured to assign each one of the plurality of next nodes a set of zero or more unique node values, each unique node value being a function of at least one number from the range of numbers, the total number of unique node values in the sets being a function of the residual capacities in the links between the current node and the next nodes,
further wherein the link selector also is configured to select the next hop node as a function of the unique node values of the plurality of next nodes.

15. The apparatus as defined by claim 12 wherein the capacity calculator is configured to use a maximum flow algorithm that determines the residual capacities of the links between the current node and the plurality of next nodes.

16. The apparatus as defined by claim 12 wherein the current node is configured to receive a lead packet of a plurality of packets in the session, the apparatus further comprising:
a lead packet modifier configured to modify the lead packet to identify the current node; and
wherein the router is configured to forward the modified lead packet toward a destination node, via the next hop node, to establish a stateful session.

17. The apparatus as defined by claim 16 wherein the stateful session comprises packets traversing from the current node to the designation node via the next hop node, and packets traversing from the destination node to the current node via the next hop node.

18. A computer program product for use on a computer system for establishing a session across a plurality of nodes in a computer network, the plurality of nodes including a current node and a plurality of next nodes, each one of the plurality of next nodes being coupled with the current node via a link, the computer program product comprising a tangible, non-transient computer usable medium having computer readable program code thereon, the computer readable program code comprising:
program code for determining residual capacities of the links between the current node and the plurality of next nodes, wherein residual capacity corresponds to amount of network flow capacity remaining in a respective link, at a given point in time, not in use or otherwise reserved;
program code for determining a sum of the residual capacities of the links between the current node and the plurality of next nodes; and
program code for generating a random number from a range of numbers, the range of numbers being a function of the sum of the residual capacities of the links between the current node and the plurality of next nodes;
program code for selecting one of the plurality of next nodes as a function of the random number and the residual capacities of the links between the current node and the plurality of next nodes, the selected next node being a next hop node; and
program code for directing packets for the session from the current node to the next hop node.

19. The computer program product as defined by claim 18 wherein each one of the plurality of next nodes is assigned a set of zero or more unique node values, each unique node value being a function of at least one number from the range of numbers, the total number of unique node values in the sets being a function of the residual capacities in the links between the current node and the plurality of next nodes,
further wherein the program code for selecting comprises program code for selecting the next hop node as a function of the unique node values of the plurality of next nodes.

20. The computer program product as defined by claim 18 further comprising program code for determining cost of the plurality of links between the current node and the plurality of next nodes, further wherein the program code for selecting comprises program code for selecting the next hop node as a function of the cost.

21. The computer program product as defined by claim 18 wherein the program code for determining the residual capacities comprises program code for executing a maximum flow algorithm that determines the residual capacities of the links between the current node and the plurality of next nodes.

22. The computer program product as defined by claim 18 wherein the program code for determining the residual capacities comprises program code for forming a network graph wherein the current node and the plurality of next nodes form vertices and the links comprise edges.

23. The computer program product as defined by claim 18 wherein the one selected node is a new current node, the computer program product comprises program code for repeating execution of the program code for determining, program code for generating, and program code for selecting for a plurality of new current nodes in the computer network to a destination node, the computer program product including program code for forming a network path through the computer network to the destination node for a given session, the computer program product including program code for forwarding packets of the given session along the selected nodes to the destination node.

24. The computer program product as defined by claim 18 wherein the current node receives a lead packet of a plurality of packets in the session, the computer program product comprising program code for modifying the lead packet to identify the current node, and program code for forwarding the lead packet toward a destination node, via the next hop node, to establish a stateful session.

* * * * *